(12) United States Patent
Kitawaki et al.

(10) Patent No.: US 11,734,063 B2
(45) Date of Patent: Aug. 22, 2023

(54) JOB MANAGEMENT BASED ON GENERATED EXECUTION TIME PREDICTION MODEL AND PREDICTION ACCURACY

(71) Applicant: HITACHI, LTD., Tokyo (JP)

(72) Inventors: Jun Kitawaki, Tokyo (JP); Takashi Tameshige, Tokyo (JP); Yasuyuki Tamai, Tokyo (JP); Kouichi Murayama, Tokyo (JP); Mineyoshi Masuda, Tokyo (JP); Yosuke Himura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 214 days.

(21) Appl. No.: 17/198,730

(22) Filed: Mar. 11, 2021

(65) Prior Publication Data

US 2021/0382751 A1 Dec. 9, 2021

(30) Foreign Application Priority Data

Jun. 3, 2020 (JP) ................................ 2020-096916

(51) Int. Cl.
*G06F 9/48* (2006.01)
*G06F 9/50* (2006.01)

(52) U.S. Cl.
CPC .......... *G06F 9/4881* (2013.01); *G06F 9/5038* (2013.01)

(58) Field of Classification Search
CPC ............................. G06F 9/4881; G06F 9/5038
See application file for complete search history.

(56) References Cited

U.S. PATENT DOCUMENTS

| 2012/0066019 A1* | 3/2012 | Hinshaw | G06Q 10/06 705/7.23 |
| 2014/0258910 A1* | 9/2014 | Liang | G06F 11/323 715/772 |

(Continued)

FOREIGN PATENT DOCUMENTS

JP 2013164712 A 8/2013

OTHER PUBLICATIONS

Häusler, Chris ; Susemihl, Alex ; Nawrot, Martin P ; Natural image sequences constrain dynamic receptive fields and imply a sparse code; 2013, vol. 1536, p. 53-67.*

*Primary Examiner* — Meng Ai T An
*Assistant Examiner* — Zujia Xu
(74) *Attorney, Agent, or Firm* — Mattingly & Malur, PC

(57) ABSTRACT

Execution end timing of a jobnet is predicted with stable accuracy. An information processing apparatus executes jobnet execution time prediction model generation processing for generating an execution time prediction model for predicting execution time of a jobnet to be executed on the basis of information associated with execution time of each of previously executed jobnets, a prediction model accuracy determination processing for calculating prediction accuracy for the execution time of each of jobnets by the generated execution time prediction model, and delay determination processing for determining whether to predict execution end timing of a designated jobnet among a jobnet group that is a set of a plurality of jobnets currently being executed or to be subsequently executed on the basis of the execution time prediction model, on the basis of the calculated prediction accuracy for the execution time of each of the jobnets.

6 Claims, 24 Drawing Sheets

(56) References Cited

U.S. PATENT DOCUMENTS

2015/0033233 A1* 1/2015 Hosokawa .............. G06F 11/30
718/102
2022/0139092 A1* 5/2022 Hashimoto ............ G06N 3/045
382/156

* cited by examiner

| JOBNET NAME | START TIME | END TIME | JOBNET END CODE |
|---|---|---|---|
| JN1 | 2019/10/01 01:00:00 | 2019/10/01 02:15:30 | 0 |
| JN2 | 2019/10/01 02:16:00 | 2019/10/01 03:17:00 | 0 |
| JN3 | 2019/10/01 03:17:30 | 2019/10/01 03:32:30 | 0 |
| JN1 | 2019/10/02 01:05:01 | 2019/10/02 03:30:05 | 1 |
| JN2 | 2019/10/02 03:30:10 | 2019/10/02 04:25:00 | 0 |

FIG.9

| | | | 254 | | 251 |
|---|---|---|---|---|---|
| | JN 1 WAIT TIME | yyyy | yyyy | | yyyy |
| 255 | JN 2 EXECUTION TIME 2 | xxxx | xxxx | | xxxx |
| 256 | JN 1 WAIT TIME 1 | xxxx | xxxx | | xxxx |
| 256 | JN 1 EXECUTION TIME N | xxxx | xxxx | | xxxx |
| 259 | JN 1 END CODE | z | z | | z |
| 255 | JN N EXECUTION TIME | xxxx | xxxx | | xxxx |
| 256 | JN N WAIT TIME 1 | xxxx | xxxx | | xxxx |
| 256 | JN N WAIT TIME N | xxxx | xxxx | | xxxx |
| 259 | JN N END CODE | z | z | | z |
| 257 | DAY OF WEEK | | | | |
| 258 | BUSINESS DAY | | | | |
| | ... | | | | |

FIG.10

| | | | | | |
|---|---|---|---|---|---|
| JN 1 EXECUTION TIME | yyyy | yyyy | | yyyy |
| JN 1 WAIT TIME 1 | xxxx | xxxx | | xxxx |
| JN 1 WAIT TIME N | xxxx | xxxx | | xxxx |
| JN 2 EXECUTION TIME | xxxx | xxxx | | xxxx |
| JN 2 END CODE | z | z | | z |
| ... | | | | |
| JN N EXECUTION TIME | xxxx | xxxx | | xxxx |
| JN N WAIT TIME 1 | xxxx | xxxx | | xxxx |
| JN N WAIT TIME N | xxxx | xxxx | | xxxx |
| JN N END CODE | z | z | | z |
| DAY OF WEEK | | | | |
| BUSINESS DAY | | | | |
| ... | | | | |

FIG.13

| ID | JN | JN | | JN | JN |
|---|---|---|---|---|---|
| 1 | JN 5 | JN 27 | | −1 | −1 |
| 2 | JN 33 | JN 67 | | JN 120 | −1 |
| 3 | JN 33 | JN 100 | | JN 23 | −1 |
| 4 | JN 12 | JN 82 | | −1 | −1 |
| 5 | JN 50 | JN 66 | | −1 | −1 |

FIG.25

| | | 154 | | 151 |
|---|---|---|---|---|
| JN 1 EXECUTION TIME | yyyy | yyyy | | yyyy |
| JN 1 WAIT TIME 1 | xxxx | xxxx | | xxxx |
| JN 1 WAIT TIME N | xxxx | xxxx | | xxxx |
| JN 2 EXECUTION TIME | xxxx | xxxx | | xxxx |
| JN 2 END CODE | z | z | | z |
| JN N EXECUTION TIME | | | | – |
| JN N END CODE | | | | – |
| JN N WAIT TIME 1 | | | | |
| JN N WAIT TIME N | | | | |
| DAY OF WEEK | | | | |
| BUSINESS DAY | | | | |
| Agent 1 CPU USAGE RATE | | | | |
| Agent 2 MEMORY USAGE RATE | | | | |
| ... | | | | |

230, 156, 155, 159, 152, 157, 158, 235

JOB MANAGEMENT BASED ON GENERATED EXECUTION TIME PREDICTION MODEL AND PREDICTION ACCURACY

CROSS-REFERENCE TO RELATED APPLICATION

This application claims priority pursuant to 35 U.S.C. § 119 from Japanese Patent Application No. 2020-096916, filed on Jun. 3, 2020, the entire disclosure of which is incorporated herein by reference.

BACKGROUND

Technical Field

The present invention relates to a job management method and a job management apparatus.

Related Art

There is known a job management method using a so-called batch job in a business management system using information technology (IT). A job means herein a unit (a command, a script, and the like) of processing using an information processing apparatus. In addition, this job is often managed by a job group called jobnet.

In the batch job, data processed in business hours is automatically reflected in the job management system according to a preset schedule after end of a business operation and before start of a next business operation (for example, during nighttime hours after end of the business operation).

Therefore, at a time of making job management using the batch job, it is always required to complete the batch job before start of a business operation, and it is necessary to detect a probability that the batch job is not completed before start of a business operation as soon as possible and take necessary measures in a case of the probability.

Now, as a batch job management system, JP2013-164712-A discloses, for example, a batch job analysis apparatus including: a designated time information storage section for storing the start scheduled time of a start time designation job; a designation acceptance section for accepting the designation of a path start job and a path end job; a time determination section for determining the start scheduled time and end scheduled time of the job between the path start job and the path end job on the basis of the result of the operation time of the job and the start scheduled time stored by the designated time information storage unit; a virtual job setting section for setting a virtual job about the start time designation job; and a critical path identification section for identifying a critical path between the path start job and the path end job by using the virtual job.

The disclosure of JP2013-164712-A is to create a job execution time prediction model on the basis of past execution logs of jobs that configure a batch job, to set an end time (threshold) per job in a manner as to go back from the end scheduled time of the batch job, and to determine each job is delayed in a case in which the job does not end even after passage of certain time from the end scheduled time.

However, with the technology of JP2013-164712-A, it is difficult to predict the execution time of the jobnet in a case of less past execution time data about each job or in a case of a large variation in values of pieces of execution time data about jobs. As a result, a problem occurs that it is impossible to appropriately estimate an end scheduled time of the jobnet.

The present invention has been achieved in light of such circumstances, and an object of the present invention is to provide a job management method and a job management apparatus capable of predicting execution end timing of a jobnet with stable accuracy.

SUMMARY

To attain the object, according to one aspect of the present invention, there is provided a job management method including executing by an information processing apparatus: jobnet execution time prediction model generation processing for generating an execution time prediction model for predicting execution time of a jobnet to be executed on the basis of information associated with execution time of each of previously executed jobnets; a prediction model accuracy determination processing for calculating prediction accuracy for the execution time of each of jobnets by the generated execution time prediction model; and delay determination processing for determining whether to predict execution end timing of a designated jobnet among a jobnet group that is a set of a plurality of jobnets currently being executed or to be subsequently executed on the basis of the execution time prediction model, on the basis of the calculated prediction accuracy for the execution time of each of the jobnets, and for displaying information associated with the execution end timing of the designated jobnet predicted on the basis of the execution time prediction model in a case of determining to predict the execution end timing of the designated jobnet on the basis of the execution time prediction model. A relation between a job and the jobnet will be described later.

Furthermore, to attain the object, according to another aspect of the present invention, there is provided a job management apparatus including: a processor; and a memory, the job management apparatus executing: jobnet execution time prediction model generation processing for generating an execution time prediction model for predicting execution time of a jobnet to be executed on the basis of information associated with execution time of each of previously executed jobnets; a prediction model accuracy determination processing for calculating prediction accuracy for the execution time of each of jobnets by the generated execution time prediction model; and delay determination processing for determining whether to predict execution end timing of a designated jobnet among a jobnet group that is a set of a plurality of jobnets currently being executed or to be subsequently executed on the basis of the execution time prediction model, on the basis of the calculated prediction accuracy for the execution time of each of the jobnets, and for displaying information associated with the execution end timing of the designated jobnet predicted based on the execution time prediction model in a case of determining to predict the execution end timing of the designated jobnet on the basis of the execution time prediction model.

According to the present invention, it is possible to predict jobnet execution end timing with stable accuracy.

Objects, configurations, and advantages other than those described above are apparent from the following description of embodiments.

BRIEF DESCRIPTION OF THE DRAWINGS

FIG. 9 is a diagram depicting an example of a jobnet wait time learning table generated by a jobnet wait time prediction model;

FIG. 10 is a diagram depicting an example of the jobnet execution time learning table;

FIG. 13 is a diagram depicting an example of a jobnet list table;

FIG. 25 is a diagram depicting an example of a jobnet execution time learning table according to the second embodiment.

DESCRIPTION OF EMBODIMENTS

First Embodiment

Figure 1:
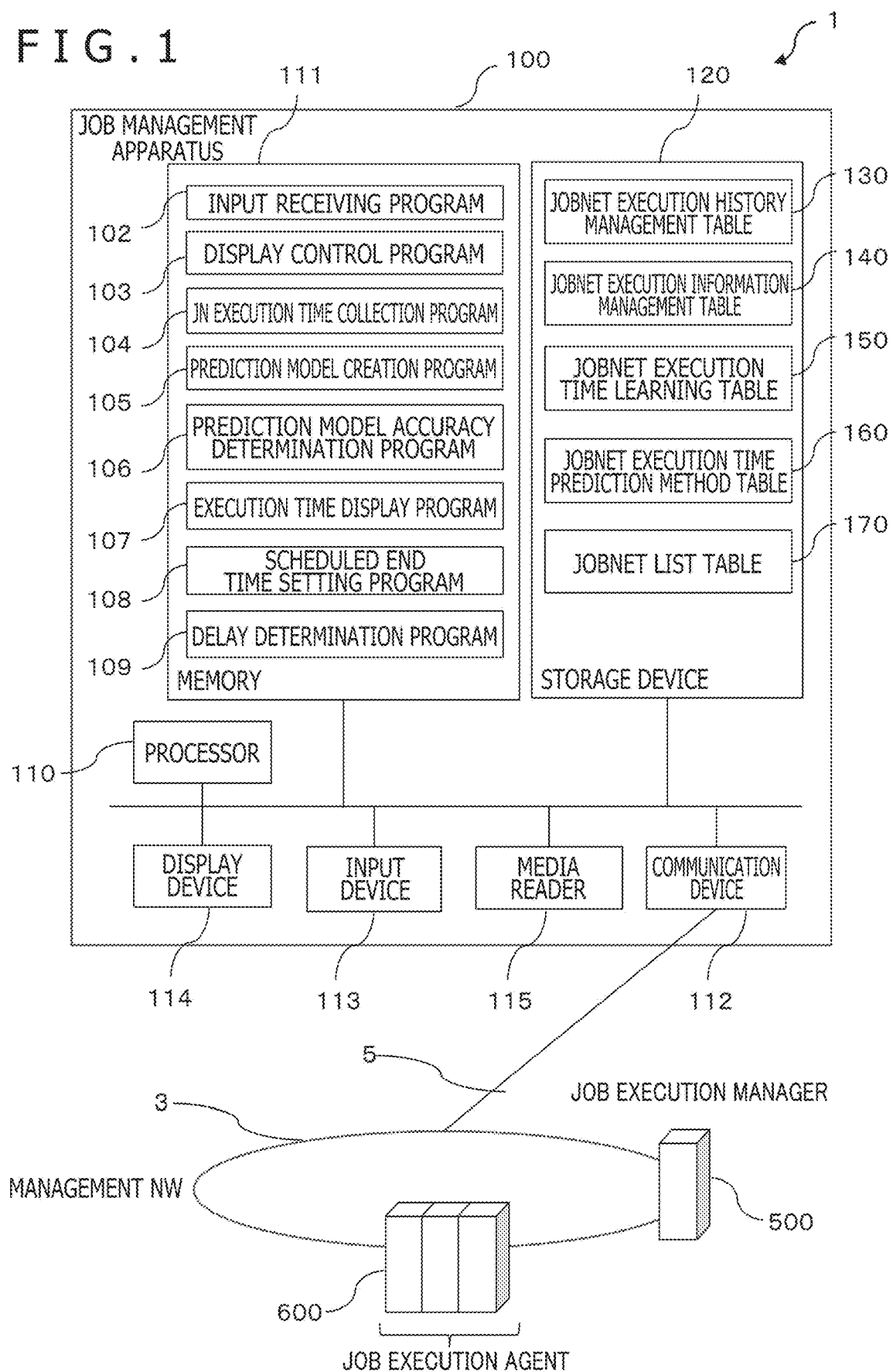
FIG. 1 is a diagram depicting an example of configurations of a job management system according to a first embodiment.

FIG. 1 is a diagram depicting an example of configurations of a job management system 1 according to a first embodiment. The job management system 1 includes a job management apparatus 100 managing a batch job that is processing configured from a plurality of jobnets (JN) (hereinafter, referred to as "path" or "jobnet list"), a job execution manager 500 that exercises control over execution of the batch job, and one or a plurality of job execution agents 600 executing jobnets in the batch job.

The batch job is a job group executing each jobnet in a designated order and at designated timing on the basis of preset job definitions.

A jobnet is a set of one or a plurality of jobs. The job is a unit of processing executed for a predetermined business operation (for example, predetermined data processing realized by a program, a command, and a script). The jobnet is executed on the basis of the job definitions. In the job definitions, it is possible to define an order of executing a plurality of jobs, conditional branching by a result of executing the jobs, and standby of the plurality of jobs.

The batch job is a flow of a series of programs for updating a large volume of data processed during daytime hours by an information processing system in charge of a predetermined business operation to update the information processing system or to reflect the large volume of data in the information processing system during nighttime hours during which the information processing system is not in operation (for example, before an operation start time of the information processing system on the next day).

It is noted that in the present embodiment, one or a plurality of paths executed by the batch job are present, and the same jobnet is often executed in a process in the plurality of paths (for example, a flow of the jobnet often branches off).

The job execution manager 500 causes each job execution agent 600 to execute a jobnet.

For example, the job execution manager 500 manages the job definitions in a database. At a time defined in each job definition, the job execution manager 500 starts a predetermined program defined in the job definition, and then transmits the job definition to each job execution agent 600 to cause the job execution agent 600 to execute each job. Upon ending execution of each job, each job execution agent 600 transmits information about an execution result of each job to the job execution manager 500. The job execution manager 500 reflects the information about the execution result of each job received from each job execution agent 600 in a predetermined database. The job execution manager 500 executes subsequent jobs or determines scheduled execution times of the subsequent jobs on the basis of the database. By causing the job execution agents 600 to execute a plurality of jobs in this way, the execution manager 500 executes each jobnet.

The job execution manager 500 and each job execution agent 600 are communicably connected by a wired or wireless management network 3 such as a dedicated line, a local area network (LAN), wide area network (WAN), or the Internet.

Furthermore, the job management apparatus 100, the job execution manager 500, and each job execution agent 600 are communicably connected by a wired or wireless management network 5 such as a LAN, WAN, the Internet, or a dedicated line.

Next, the job management apparatus 100 is configured with a processor 110 such as a CPU, a memory 111 such as a random access memory (RAM) or a read only memory (ROM) into which a program, data, and the like are allocated and stored, a storage device 120 such as a hard disk drive (HDD), a solid state drive (SSD), or a flash memory, a communication device 112 such as a network interface card for communicating with other information processing apparatuses, a media reader 115 to which an external storage medium is connected, an input device 113 such as a keyboard or a touch panel, and a display device 114 including an output device such as a monitor or a display, and these constituent elements are connected to one another by a bus or the like. It is noted that the external storage medium is, for example, a communication medium (that is, a network such as a wired, wireless, or optical network, or a carrier wave and a digital signal propagated through the network), or a storage medium detachably attached to the media reader 115. It is noted that the job execution manager 500 and each job execution agent 600 is configured with similar hardware.

Next, the job management apparatus 100 stores therein an input receiving program 102, a display control program 103, a jobnet execution time collection program 104, a prediction model creation program 105, a prediction model accuracy determination program 106, an execution time display program 107, a scheduled end time setting program 108, and a delay determination program 109.

The input receiving program 102 receives an input of information from a user.

The display control program 103 displays information on the display device 114.

The jobnet execution time collection program 104 collects information associated with execution time of each previously executed jobnet.

In addition, the jobnet execution time collection program 104 calculates a statistical value of the execution time of each jobnet on the basis of the information associated with the execution time of each previously executed jobnet.

Specifically, the jobnet execution time collection program 104 calculates, as the statistical value of the execution time of each jobnet, an average value and a maximum value of the execution time of each jobnet on the basis of the information associated with the execution time of each previously executed jobnet.

The prediction model creation program 105 generates an execution time prediction model that predicts execution time of a jobnet to be executed on the basis of the information associated with the execution time of each previously executed jobnet.

In addition, the prediction model creation program 105 calculates, as one piece of the information associated with the execution time of each previously executed jobnet, wait time that is a difference between an execution start time of each previously executed jobnet and an execution time of the other jobnet completed with execution before the previously executed jobnet, and generates an execution time prediction model on the basis of the calculated wait time.

It is noted that the prediction model creation program 105 may estimate an order of executing jobnets on the basis of the information associated with the execution time of each previously executed jobnet.

The prediction model accuracy determination program 106 calculates prediction accuracy for execution time of each jobnet by the execution time prediction model generated by the prediction model creation program 105.

The execution time display program 107 displays information about the execution time of each jobnet based on the prediction model creation program 105 or the like on the display device 114 or the like.

The scheduled end time setting program 108 receives an input of a scheduled end time of jobnet execution (to be described later in detail) from the user.

The delay determination program 109 determines whether to predict execution end timing of a designated jobnet among a job group (batch job) that is a set of a plurality of jobnets currently being executed or to be executed subsequently on the basis of an execution time prediction model, on the basis of the prediction accuracy of the execution time of each jobnet calculated by the prediction model accuracy determination program 106, and displays information associated with the execution end timing of the designated jobnet predicted on the basis of the execution time prediction model in a case of determining to execute the execution end timing of the designated jobnet on the basis of the execution time prediction model.

Specifically, the delay determination program 109 determines whether to predict the execution end timing of the designated jobnet based on the execution time prediction model by determining whether prediction accuracy for execution time of the designated jobnet is equal to or higher than a predetermined value, and displays the information associated with the execution end timing of the designated jobnet predicted based on the execution time prediction model in a case of determining that each prediction accuracy for the execution time is equal to or higher than the predetermined value.

Furthermore, the delay determination program 109 determines whether to predict the execution end timing of the designated jobnet based on the execution time prediction model by determining whether the prediction accuracy for the execution time of the designated jobnet is equal to or higher than the predetermined value, and displays information associated with the execution end timing of the designated jobnet calculated based on the statistical value calculated by the jobnet execution time collection program 104 in a case of determining that the prediction accuracy for the execution time is not equal to or higher than the predetermined value.

Moreover, in the case of determining that the prediction accuracy for the execution time of the designated jobnet is not equal to or higher than the predetermined value, the delay determination program 109 waits for a predetermined period of time before displaying the information associated with the execution end timing of the designated jobnet calculated based on the statistical value calculated by the jobnet execution time collection program 104.

Furthermore, in the case of determining that the prediction accuracy for the execution time is not equal to or higher than the predetermined value, the delay determination program 109 further determines whether the execution time of the designated jobnet is equal to or longer than predetermined time, displays the information associated with the execution end timing of the designated jobnet calculated based on the maximum value calculated by the jobnet execution time collection program 104 in a case in which the execution time of the designated jobnet is equal to or longer than the predetermined time, and displays the information associated with the execution end timing of the designated jobnet calculated based on the average value calculated by the jobnet execution time collection program 104 in a case in which the execution time of the designated jobnet is not equal to or longer than the predetermined time.

It is noted that the delay determination program 109 may identify the jobnet ahead of the designated jobnet in the order of executing the jobnets on the basis of the order of executing the jobnets estimated by the prediction model creation program 105.

Furthermore, the job management apparatus 100 stores therein information about a jobnet execution history management table 130, a jobnet execution information management table 140, a jobnet execution time learning table 150, a jobnet execution time prediction model (not depicted), a jobnet execution time prediction method table 160, and a jobnet list table 170. Details of these pieces of information will be described later.

The programs of the job management apparatus 100 described thus far are stored in, for example, dedicated hardware, the memory 111, or the storage device 120. Furthermore, functions of each program are realized by causing the processor 110 to read and execute the program stored in any of these locations. It is noted that the programs may be stored in the external storage medium in advance or may be introduced via a predetermined communication necessary as needed.

Subsequently, processing performed in the job management system 1 will be described.

—Processing—

Figure 2:
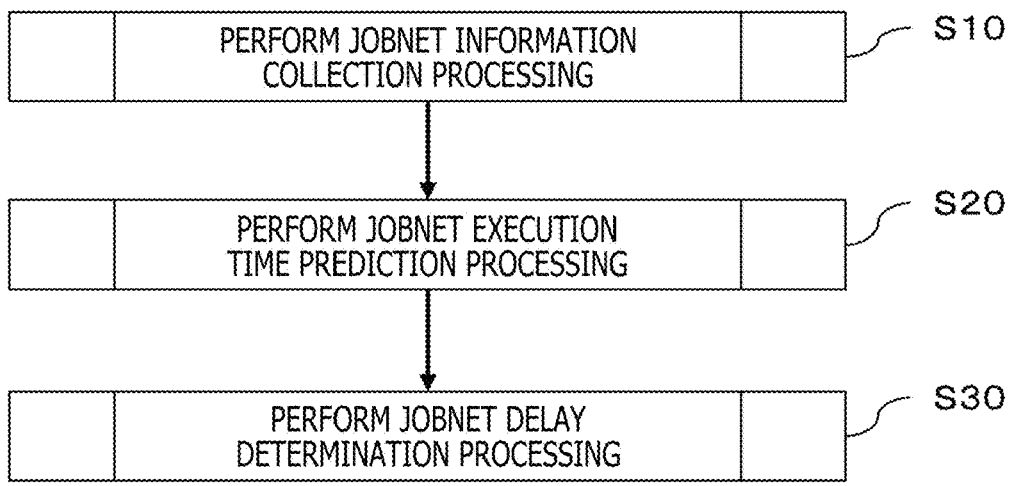
FIG. 2 is a flowchart illustrating an outline of job management processing performed in the job management system.

FIG. 2 is a flowchart illustrating an outline of job management processing performed in the job management system 1. The job management processing is executed, for example, at predetermined timing (for example, at a predetermined time, at predetermined time intervals, or at timing designated by the user) after the job management apparatus 100 is started.

First, the job management system 1 executes jobnet information collection processing S10 for collecting or generating information for predicting execution time of each jobnet (S10).

The job management system 1 then executes jobnet execution time prediction processing S20 for predicting an end time of each jobnet on the basis of the jobnet execution time collection processing (S20).

The job management system 1 executes jobnet delay determination processing S30 for determining a delay situation of execution of each jobnet in a currently executed batch job on the basis of the jobnet execution time prediction processing (S30).

These series of processing will be described hereinafter.

—Jobnet Execution Time Collection Processing—

Figure 3:
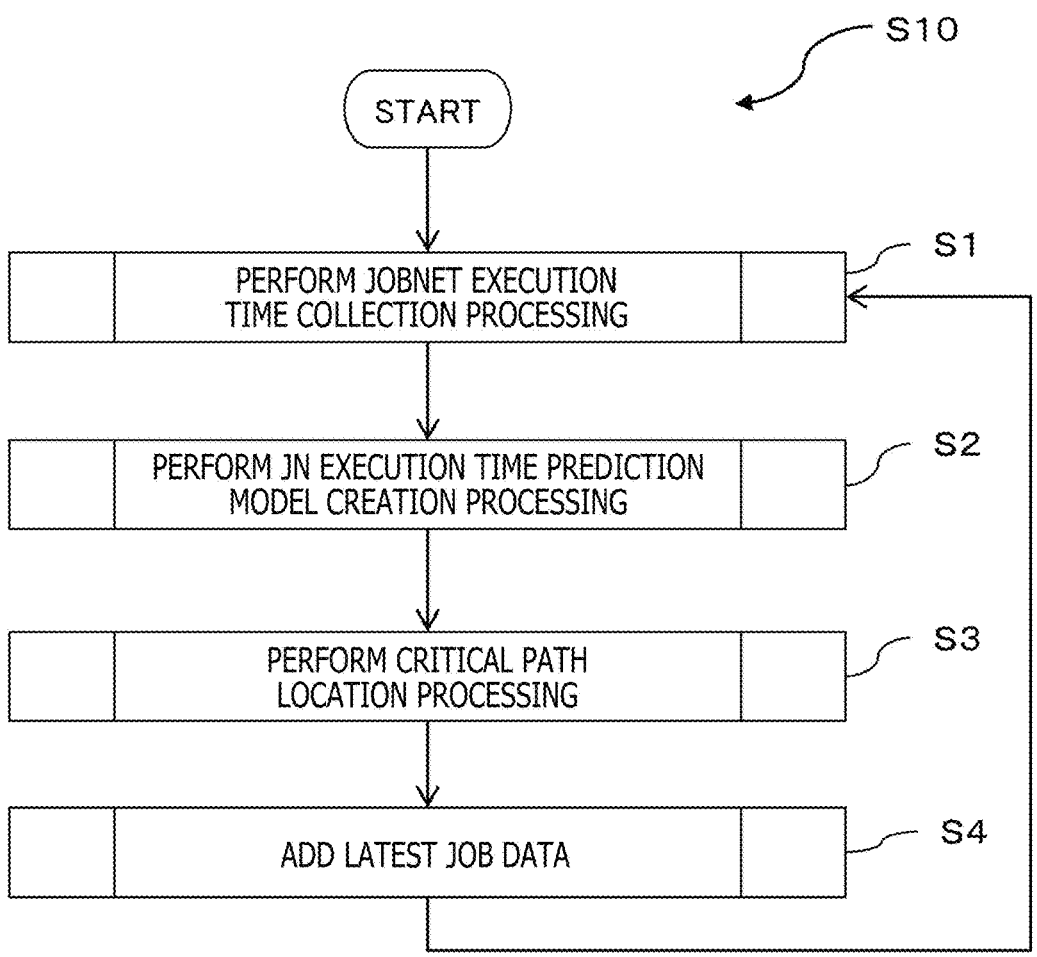
FIG. 3 is a flowchart illustrating an example of jobnet information collection processing.

FIG. 3 is a flowchart illustrating an example of the jobnet information collection processing S10. The jobnet information collection processing S10 is repeatedly executed, for example, at predetermined timing (for example, in a case of a predetermined input from the user, at a predetermined time, or at predetermined time intervals) after the job management apparatus 100 is started.

First, the jobnet execution time collection program 104 in the job management apparatus 100 executes jobnet execution time collection processing S1 for collecting information associated with a previously executed jobnet (including a case in which the same jobnet was previously executed a plurality of times in the past) from the job execution manager 500 (S1). The jobnet execution time collection program 104 stores an execution result of the jobnet execution time collection processing S1 in the jobnet execution history table 130 and the jobnet execution information management table 140. Details of the jobnet execution time collection processing S1 will be described later.

(Jobnet Execution History Management Table)

Figure 4:
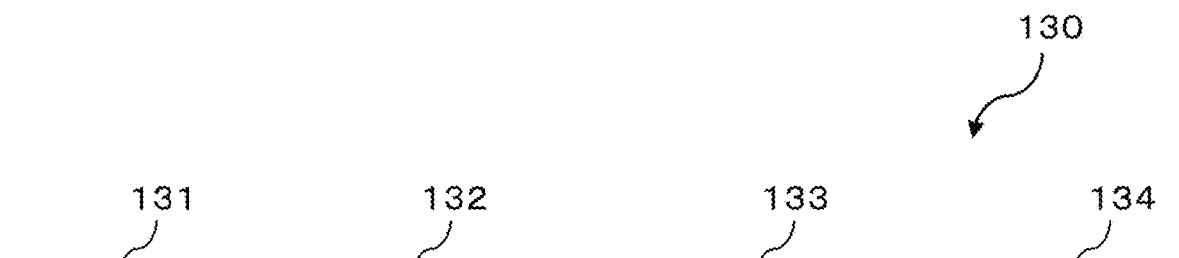
FIG. 4 is a diagram depicting an example of a jobnet execution history management table.

FIG. 4 is a diagram depicting an example of the jobnet execution history management table 130. The jobnet execution history management table 130 is a database configured with records each having items including a jobnet name item 131 that is a name (corresponding to a type, an ID, or the like of the jobnet executed at each timing, a start clock time item 132 that is timing of start of executing the jobnet related to the jobnet name item 131, an end time item 133 that is timing of end of executing the jobnet related to the jobnet name item 131, and a jobnet end code item 134 that is information representing an execution result of the jobnet related to the jobnet name item 131.

(Jobnet Execution Information Management Table)

Figure 5:
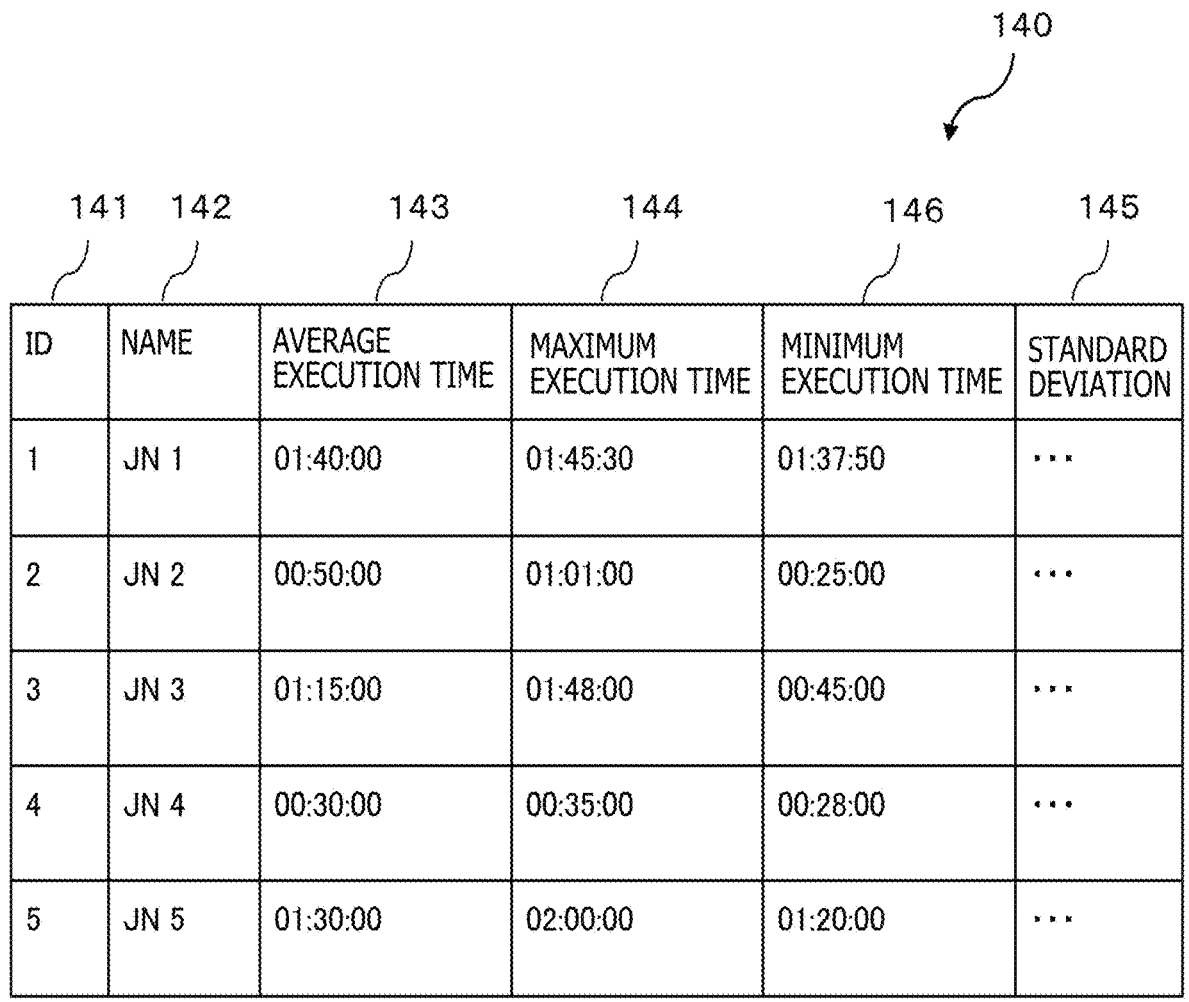
FIG. 5 is a diagram depicting an example of a jobnet execution history management table.

Next, FIG. 5 is a diagram depicting an example of the jobnet execution information management table 140. The jobnet execution information management table 140 is a database configured with records each having items including a jobnet ID item 141 that is an ID for identifying a jobnet, a jobnet name item 142 that is a name of the jobnet related to the jobnet ID item 141, a jobnet average execution time item 143 that is average execution time (since the same jobnet is often executed a plurality of times) of the jobnet related to the jobnet ID item 141, a jobnet maximum execution time item 144 that is a maximum value out of the execution time of the jobnet related to the jobnet ID 141, a jobnet minimum execution time item 146 that is a minimum value out of the execution time of the jobnet related to the jobnet ID 141, and a standard deviation item 145 of the execution time of the jobnet related to the jobnet ID item 141.

Next, as depicted in FIG. 3, the prediction model creation program 105 executes jobnet execution time prediction model creation processing S2 that generates a job execution time prediction model for predicting the execution time of each jobnet to be executed subsequently on the basis of the information about the execution time of each jobnet collected in S1 in the past (S2). Details of the jobnet execution time prediction model creation processing S2 will be described later.

The prediction model creation program 105 executes critical path identifying processing S3 that identifies a path (hereinafter, referred to as "critical path") that most affects an end time of the batch job on the basis of the jobnet execution time prediction model generated in S2 (S3). Details of the critical path identifying processing S3 will be described later.

The prediction model creation program 105 stores the information about the jobnet calculated in S1 to S3 (S4). That is all for the jobnet information collection processing S10.

Details of each processing in the jobnet information collection processing S10 will next be described.

—Jobnet Execution Time Collection Processing—

Figure 6:
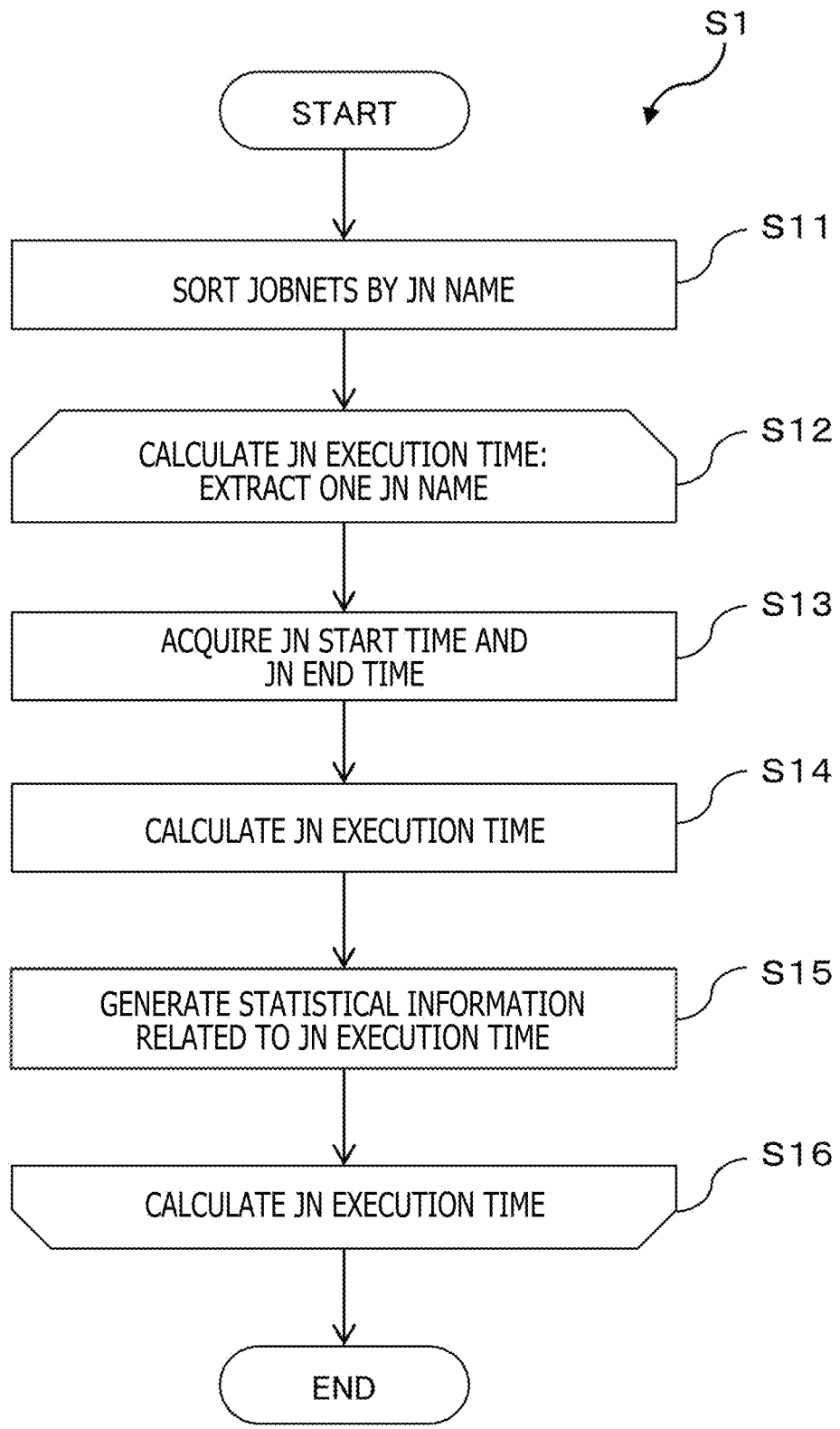
FIG. 6 is a flowchart illustrating details of jobnet execution time collection processing.

FIG. 6 is a flowchart illustrating details of the jobnet execution time collection processing S1. First, the jobnet execution time collection program 104 sorts the jobnets in a jobnet previous execution list registered in the jobnet execution history management table 130, according to the jobnet names (S11).

The jobnet execution time collection program 104 selects a jobnet having a certain optional name (hereinafter, referred to as "selected JN") from among the jobnets sorted in S11 (S12).

Specifically, the jobnet execution time collection program 104 acquires all of the records in each of which the certain optional jobnet name is set to the jobnet name item 131 among the records in the jobnet execution history management table 130.

The jobnet execution time collection program 104 acquires execution start time and execution end time of the selected JN (S13).

Specifically, the jobnet execution time collection program 104 acquires values of the start time item 132 and the end time item 133 in each of the records related to the selected JN in the jobnet execution history management table 130 acquired in S12.

The jobnet execution time collection program 104 calculates each execution time of the selected JN (S14).

Specifically, the jobnet execution time collection program 104 subtracts each value of the start time item 132 from each value of the end time item 133 acquired in S13.

The jobnet execution time collection program 104 calculates statistical information related to each execution time of the selected JN and stores the calculated statistical information (S15).

For example, the jobnet execution time collection program 104 calculates average execution time of the selected JN. Specifically, the jobnet execution time collection program 104 generates a new record related to the name of the selected JN in the job execution information management table 140, and stores an average value of each subtraction value calculated in S14 in the jobnet average execution time item 143 in the generated record.

Furthermore, the jobnet execution time collection program 104 calculates a maximum value and a minimum value of the execution time of the selected JN. Specifically, the jobnet execution time collection program 104 stores a maximum value of each execution time calculated in S14 in the jobnet maximum execution time item 144 in the generated record.

Moreover, the jobnet execution time collection program 104 stores a minimum value of each execution time calculated in S14 in the jobnet minimum execution time item 146 in the generated record.

Furthermore, the jobnet execution time collection program 104 calculates a standard deviation of the execution time of the selected JN. Specifically, the jobnet execution time collection program 104 stores a standard deviation of each execution time calculated in S14 in the standard deviation item 145 in the generated record.

Next, in a case of presence of the job net having the name that is not selected yet in the jobnet execution history management table 130, the jobnet execution time collection program 104 repeatedly executes the processing in and after S12 with the jobnet having the unselected name set as a new selected JN. In a case of selecting the jobnets having all names, the jobnet execution time collection program 104 ends the jobnet execution time collection processing S1.

—Jobnet Execution Time Prediction Model Generation Processing—

Figure 7:
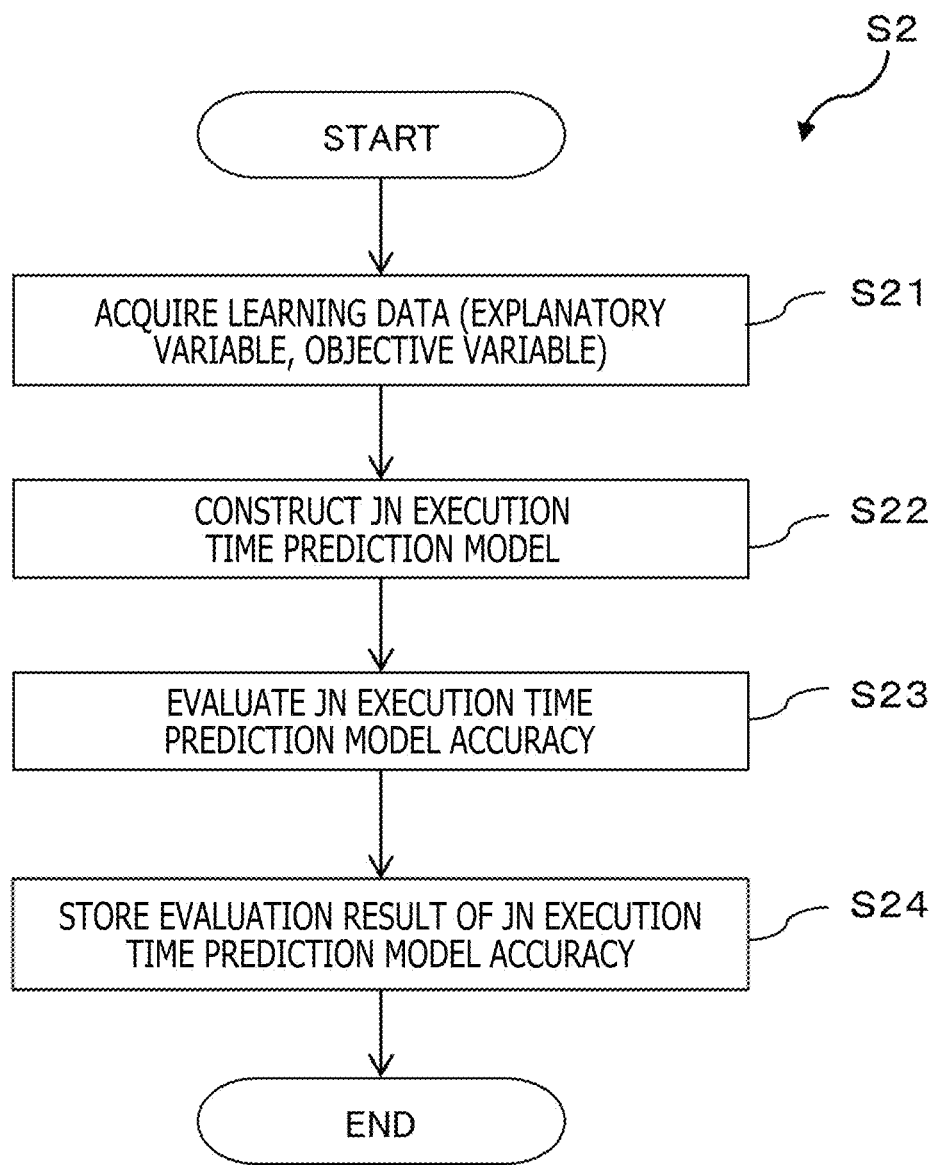
FIG. 7 is a flowchart illustrating details of jobnet execution time prediction model generation processing.

Next, FIG. 7 is a flowchart illustrating details of the jobnet execution time prediction model generation processing S2.

First, the prediction model creation program 105 acquires learning data (specifically, explanatory variables and objective variables) that is information about the previously executed jobnets for use in generation of the jobnet execution time prediction model (S21).

Specifically, the prediction model creation program 105 acquires, as an objective variable of each jobnet, jobnet execution time obtained by subtracting the value of the start time item 132 from the value of the end time item 133 in the jobnet execution history management table 130 corresponding to the ID item 141 in each record in the jobnet execution information management table 140.

Furthermore, the prediction model creation program 105 acquires, as one explanatory variable for the objective variable, a day of week on which each jobnet is executed (hereinafter, referred to as "execution day of week"). Moreover, for example, the prediction model creation program 105 acquires, as one explanatory variable, information about a business day on which each jobnet is executed (hereinafter, referred to as "execution business day information," for example, information as to what day of the month the business day is).

Furthermore, the prediction model creation program 105 acquires, as one explanatory variable, execution time (hereinafter, referred to as "prerequisite JN execution time") of the other jobnet (hereinafter, "prerequisite JN") execution of which always ends ahead of each jobnet by referring to the start time items 132 and the end time items 133 in the jobnet execution history management table 130. In this case, the prediction model creation program 105 makes the execution time per prerequisite JN one execution time by adding conditions that (1) a date related to a jobnet execution start time is made identical between the intended jobnet and the prerequisite JN, or that (2) a date related to the execution start time of the jobnet for which a prediction model is generated is made identical to a date related to the execution end time of the prerequisite JN.

Furthermore, the prediction model creation program 105 acquires, as one explanatory variable, an end code of each jobnet by referring to the jobnet end code item 134 in the jobnet execution history management table 130.

Moreover, the prediction model creation program 105 calculates, as one explanatory variable, a temporal difference (wait time) between the execution end time of the other jobnet the execution of which ends ahead of the execution start time of each jobnet and the execution start time of the jobnet by referring to the start time items 132 and the end time items 133 in the jobnet execution history management table 130.

(Prerequisite JN Execution Time and Wait Time)

Figure 8:
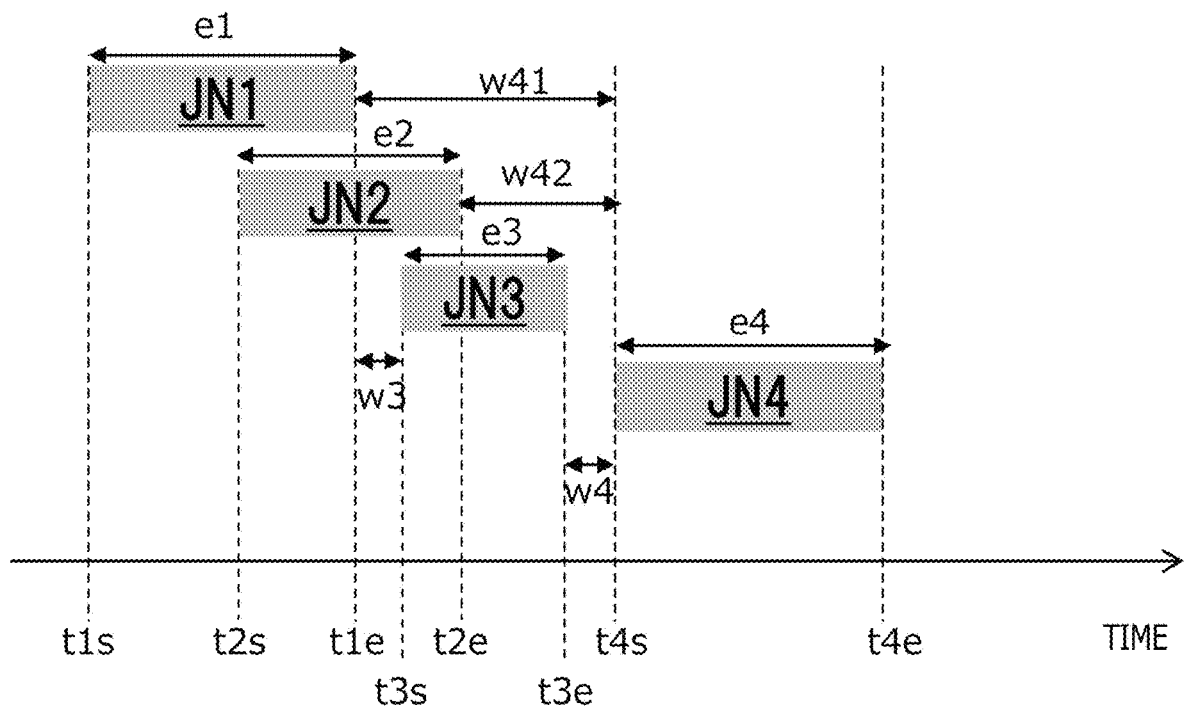
FIG. 8 is an explanatory diagram of an example of method of calculating prerequisite JN execution time and wait time.

Now, FIG. 8 is a diagram illustrating an example of a method of calculating prerequisite JN execution time and wait time.

For example, the prediction model creation program 105 identifies the other jobnet JN1 at an execution end time t1$e$, at which the execution of the jobnet JN1 ends ahead of an execution start time t3$s$ of a jobnet JN3. For example, the prediction model creation program 105 defines execution time e1 of the identifies other jobnet JN1 as prerequisite JN execution time for the subsequent jobnet JN3. In addition, since the identified other jobnet JN1 is only the other jobnet, the prediction model creation program 105 defines a temporal difference between the execution start time t3$s$ of the jobnet JN3 and the execution end time t1$e$ of the other jobnet JN1 as wait time w3 of the jobnet JN3 with respect to the other jobnet JN1.

Furthermore, the prediction model creation program 105 identifies a plurality of other jobnets JN1, JN2, and JN3 at execution end times t1e, t2$e$, and t3$e$, at which execution of the jobnets JN1, JN2, and JN3 ends ahead of an execution start time t4$s$ of a jobnet JN4. The prediction model creation program 105 defines each of execution time (e1, e2, and e3) of the plurality of other jobnets JN1, JN2, and JN3 as the prerequisite JN execution time for the subsequent jobnet JN4. Furthermore, the prediction model creation program 105 defines a temporal difference between the execution end time t3$e$ of the jobnet JN3, at which the execution of the jobnet JN3 ends just before the execution start time t4$s$ of the jobnet JN4, and the execution start time t4$s$ of the jobnet JN4 as wait time w4 of the jobnet JN4, among the plurality of other jobnets JN1, JN2, and JN3. Likewise, a temporal difference w41 between the execution end time t1$e$ of the jobnet JN1 and the execution start time t4$s$ of the jobnet JN4, and a temporal difference w42 between the execution end time t2$e$ of the jobnet JN2 and the execution start time t4$s$ of the jobnet JN4 may be each handled as wait time of the jobnet JN4.

It is noted that the wait time of each jobnet may be calculated using a predetermined prediction model. In other words, the prediction model creation program 105 may calculate the wait time of each jobnet by generating a jobnet wait time prediction model calculating the wait time of each jobnet on the basis of the learning data acquired in S21.

(Jobnet Wait Time Learning Table)

FIG. 9 is a diagram depicting an example of a jobnet wait time learning table 220 generated by the jobnet wait time prediction model. Jobnet wait time learning tables 220 as many as the ID items 141 in the jobnet execution information management table 140 are present, and each similar in configurations to a jobnet execution time learning table 150 to be described later.

In other words, the jobnet wait time learning table 220 is information that stores combinations of a series of wait time 251 of each jobnet concerned as objective variables in the jobnet wait time learning table 220 and explanatory variables 252 explaining each wait time 251, and values 254 of the explanatory variables 252 for the combinations. The explanatory variables 252 include, for example, variables of subsequently executed JN execution time 255 to be described later, wait time 256 of each jobnet, an execution day of week 257 of each jobnet, execution business day information 258 about each jobnet, and an end code 259 of the subsequently executed JN.

Next, as depicted in S22 of FIG. 7, the prediction model creation program 105 generates the jobnet execution time prediction model on the basis of the learning data acquired in S21 (S22). The prediction model creation program 105 stores a result of the generated jobnet execution time prediction model in the storage device 120.

For example, the prediction model creation program 105 learns a relation between each explanatory variable and each objective variable acquired in S21 by performing machine learning (for example, learning by a decision tree such as a random forest, or learning by deep learning) on feature variables of the objective variable and the explanatory variable, and calculates the feature variables related to the explanatory variable and the objective variable. The prediction model creation program 105 stores combinations of the objective variable and the explanatory variable having feature variables equal to or higher than a predetermined value in the storage device 120.

(Jobnet Execution Time Learning Table)

FIG. 10 is a diagram depicting an example of the jobnet execution time learning table 150. The jobnet execution time learning table 150 is information that stores combinations of a series of execution time 151 of each jobnet as objective variables for generating the jobnet execution time prediction model and explanatory variables 152 explaining the execution time of each jobnet 151, and values 154 of the explanatory variables for the jobnet execution time.

The explanatory variables 152 include, for example, variables of subsequently executed JN execution time 155 to be described later, wait time 156 of each jobnet, an execution day of week 157 of each jobnet, execution business day information 158 about each jobnet, and an end code 159 of the subsequently executed JN.

Next, as depicted in S23 of FIG. 7, the prediction model accuracy determination program 106 evaluates prediction accuracy of the jobnet execution time prediction model generated in S22, that is, prediction accuracy based on the jobnet execution time prediction model created from the jobnet execution time learning table 150 in a relation with each jobnet.

For example, the prediction model accuracy determination program 106 predicts execution time of each jobnet by calculating or acquiring the explanatory variables (for example, the execution day of week, the execution business day information, the subsequently executed JN execution time, the end code, and the wait time) of each previously executed jobnet (hereinafter, referred to as "evaluation jobnet") which is not used in generation of the jobnet execution time prediction model and the execution time of which is measured from the jobnet execution history management table 130 and the like and inputting the calculated or acquired explanatory variables to the jobnet execution time prediction model (stored in the storage device 120). The prediction model accuracy determination program 106 calculates the accuracy of the jobnet execution time prediction model in the relation with each jobnet by calculating a temporal difference between this predicted execution time and the measured execution time.

The prediction model accuracy determination program 106 registers information about the prediction accuracy for the execution time of the evaluation jobnet calculated in S23 in a jobnet execution time prediction method table 160 (S24).

(Jobnet Execution Time Prediction Method Table)

Figure 11:
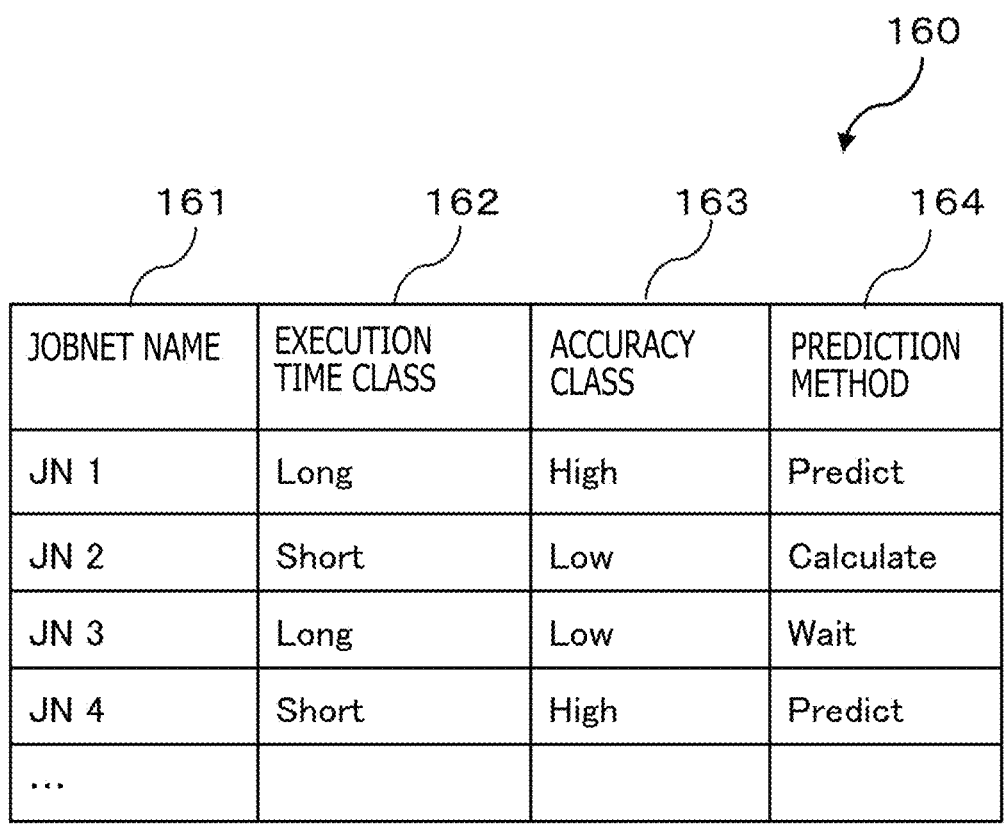
FIG. 11 is a diagram depicting an example of a jobnet execution time prediction method table.

FIG. 11 is a diagram depicting an example of the jobnet execution time prediction method table 160. The jobnet execution time prediction method table 160 is a database configured with records each having items including a jobnet name item 161 that is a name of each jobnet, a jobnet execution time class item 162 indicating a class of a length (hereinafter, referred to as "length class") of the execution time of the jobnet related to the jobnet name 161, a jobnet prediction accuracy class item 163 that is a class of accuracy (hereinafter, referred to as "accuracy class") of time of prediction in a case of predicting the execution time of the jobnet related to the jobnet name 161 in the jobnet execution time prediction table 160, and a jobnet execution time prediction method item 164 that is information for identifying a method of prediction (hereinafter, referred to as "prediction method") of the execution time of the jobnet related to the jobnet name 161.

As the length class, information in response to the length of execution time of the jobnet is set. For example, to the jobnet execution time class item 162, "Long" is set in a case in which the average execution time of the jobnet exceeds a predetermined threshold T, and "Short" is set in a case in which the average execution time of the jobnet is equal to or shorter than the predetermined threshold T.

It is noted that as the length class, "Long" or "Short" may be set depending on whether the execution time estimated based on the jobnet execution time prediction model exceeds the predetermined threshold T.

The accuracy class is an index representing prediction accuracy. For example, to the jobnet prediction accuracy class item 163, "Low" is set in a case in which a width of a prediction value exceeds a predetermined threshold, for example, deviates from, for example, a 2σ section, and "High" is set in a case in which the prediction value (temporal difference) is equal to or smaller than the predetermined threshold, for example, falls within the 2σ section.

The prediction method is a method of predicting the execution time of a jobnet. Specifically, the prediction method is set on the basis of the jobnet execution time class item 162 and the jobnet prediction accuracy class item 163.

In a case, for example, in which the jobnet prediction accuracy class item 163 is "High", "Predict" is set to the prediction method item 164. In a case in which the jobnet prediction accuracy class item 163 is "Low" and the jobnet execution time class item 162 is "Long," "Wait" is set to the prediction method item 164. In a case in which the jobnet prediction accuracy class item 163 is "Low" and the jobnet execution time class item 162 is "Short," "Calculate" is set to the prediction method item 164.

Among these prediction methods, "Predict" indicates that the execution time of the jobnet is predicted using the jobnet execution time prediction model.

"Calculate" indicates that the execution time of the jobnet is calculated (predicted) on the basis of the statistical information about the jobnet (such as the maximum value or the average value of the execution time of the jobnet).

"Wait" indicates that the execution time of the jobnet is calculated (predicted) based on predetermined statistical information (the maximum value of the execution time of the jobnet) but that display of the information associated with the execution time to the user is deferred for a predetermined period of time.

—Critical Path Identifying Processing—

Figure 12:
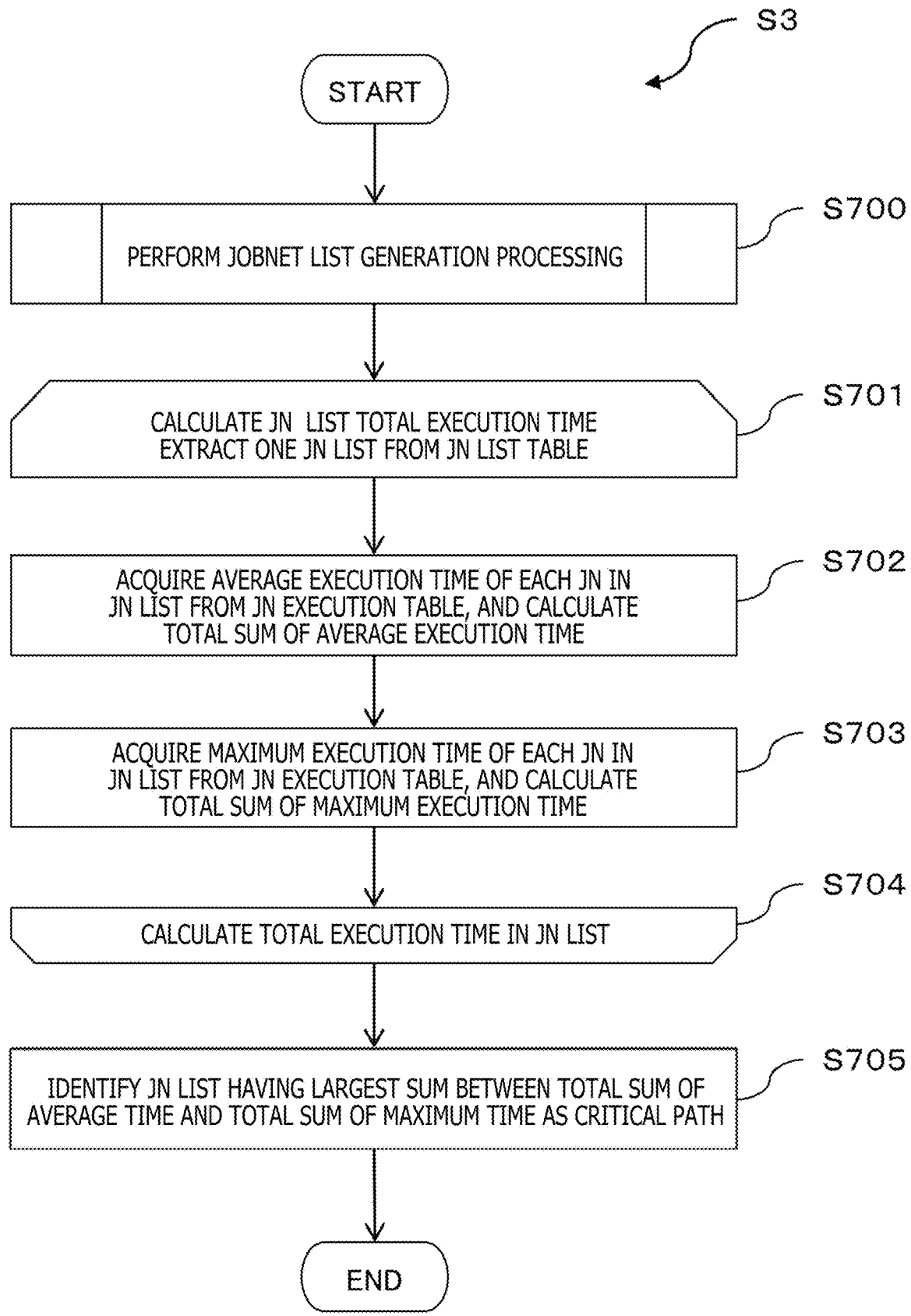
FIG. 12 is a flowchart illustrating details of critical path identifying processing.

Next, FIG. 12 is a flowchart illustrating details of the critical path identifying processing S3. First, the prediction model creation program 105 executes jobnet list generation processing for estimating a dependence relation among the jobnets in the batch job with respect to the processing (time) on the basis of a result of the jobnet execution time prediction model, and for generating information about one or a plurality of jobnet lists (paths) from the estimated dependence relation (S700).

It is noted that the prediction model creation program 105 registers information about the jobnet list(s) in the jobnet list table 170. Details of the jobnet list generation processing S700 will be described later.

The jobnet list table 170 will now be described.

(Jobnet List Table)

FIG. 13 is a diagram depicting an example of the jobnet list table 170. The jobnet list table 170 is configured with records each having items including a jobnet list item ID 171 that is an ID of a jobnet list (path), and a jobnet configuration item 172 that indicates jobnets configuring the jobnet list related to the jobnet list ID item 171 and an order of the jobnets with respect to the processing.

It is noted that a value (−1) indicating that a previous jobnet is not present is set to the jobnet configuration item 172. As indicated by this jobnet list table 170, a plurality of jobnet lists often form a branching structure.

Next, as depicted in S701 of FIG. 12, the prediction model creation program 105 selects one list (referred to as "selected list" herein) from among the jobnet lists generated in the jobnet list generation processing (S701). Specifically, the prediction model creation program 105 selects one records from among the records in the jobnet list table 170.

The prediction model creation program 105 calculates an average value of the execution time in the selected list on the basis of the jobnet list table 170 and the jobnet execution information management table 140 (S702).

Specifically, the prediction model creation program 105 acquires average execution time of each jobnet recorded in the jobnet configuration item 172 in the record selected in S701 from the jobnet average execution time item 143 in the corresponding record in the jobnet execution information management table 140. The prediction model creation program 105 sums up the acquired average execution time.

Furthermore, the prediction model creation program 105 calculates a maximum value of the execution time in the selected list on the basis of the jobnet list table 170 and the jobnet execution information management table 140 (S703).

Specifically, the prediction model creation program 105 acquires the maximum execution time of each jobnet recorded in the jobnet configuration item 172 in the record selected in S701 from the jobnet maximum execution time 144 in the corresponding record in the jobnet execution information management table 140. The prediction model creation program 105 sums up values of the acquired jobnet maximum execution time items 144.

In a case of presence of the other jobnet list that is not selected so far as the selected list, the prediction model creation program 105 repeats the processing in and after S701 with the jobnet list defined as the new selected list (S704). In a case of selecting all jobnet lists as the selected lists, the prediction model creation program 105 executes processing in S705 to be described next.

In other words, in S705, the prediction model creation program 105 identifies a critical path on the basis of the execution time calculated in S701 to S705.

HALT

Specifically, the prediction model creation program 105 calculates a total value of the average values and the maximum values of the execution time calculated in S701 to S704 for each jobnet list. The prediction model creation program 105 identifies the jobnet list having a maximum calculated total value as the critical path. That is all for the critical path identifying processing S3.

The jobnet list generation processing S700 in the critical path identifying processing S3 will now be described.

—Jobnet List Generation Processing—

Figure 14:
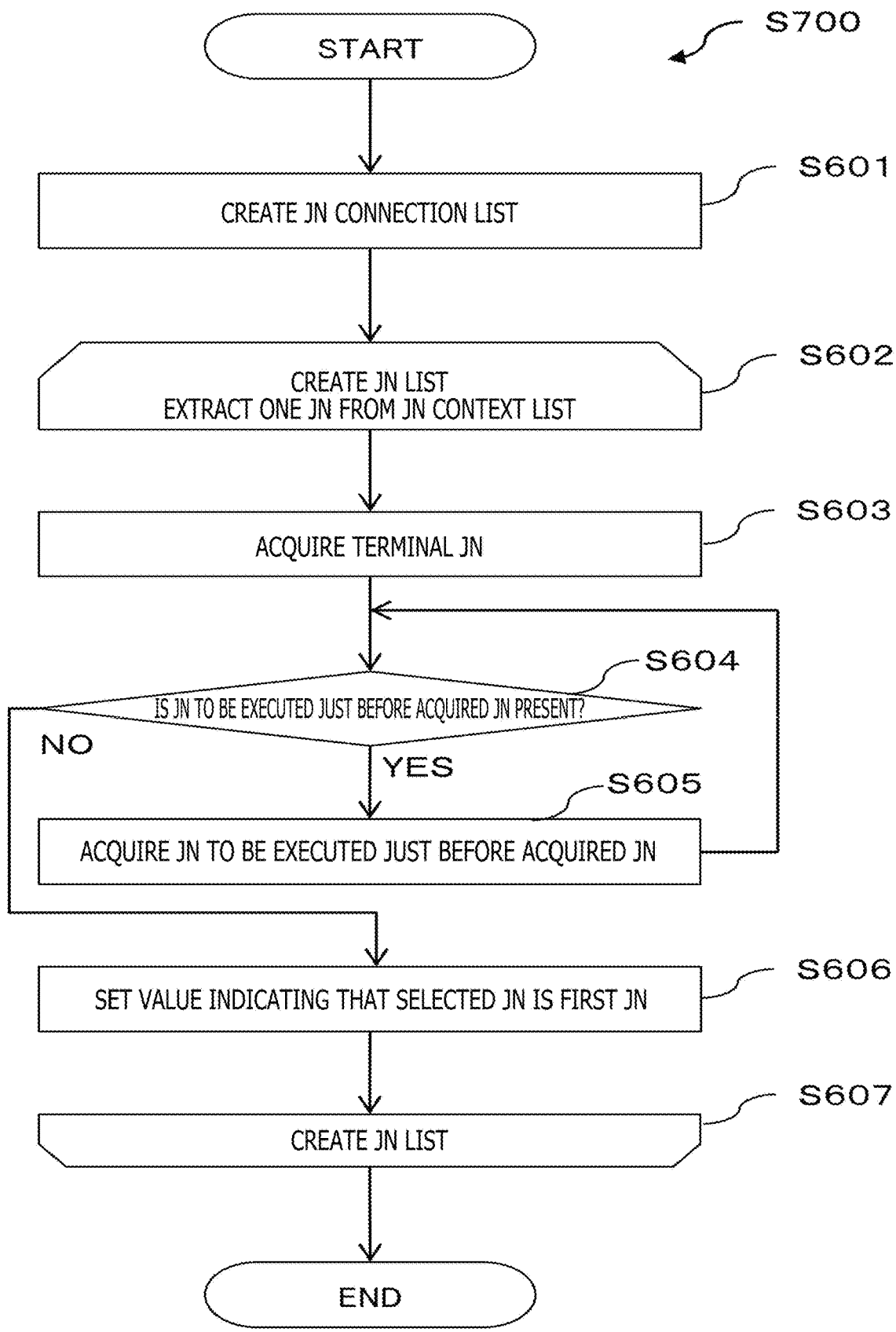
FIG. 14 is a flowchart illustrating details of jobnet list generation processing.

FIG. 14 is a flowchart illustrating details of the jobnet list generation processing S700. First, the prediction model creation program 105 in the job management apparatus 100 estimates processing-related connections of the jobnets on the basis of the jobnet execution time prediction model (S601).

Specifically, the prediction model creation program 105 identifies, for example, a combination of the connection of the jobnets having the largest feature amounts among the combinations of the connection of the jobnets by referring to and comparing with the feature amounts 154 for the combination of the execution time 151 of each jobnet as the objective variable of the jobnet and the explanatory variables 152 of the jobnet in the jobnet execution time learning table 150 generated in the jobnet execution time prediction model creation processing.

The prediction model creation program 105 selects one jobnet (referred to herein as "selected JN") from among the jobnets (S602).

The prediction model creation program 105 acquires a last jobnet (terminal JN) among the jobnets to be executed after the selected JN on the basis of the connection of the jobnets identified in S601 (S603). For example, the prediction model creation program 105 registers the ID of the acquired jobnet in a first item of the jobnet configuration item 172 in a new record created in the jobnet list table 170.

The prediction model creation program 105 determines whether the other jobnet to be executed just before the jobnet acquired in S603 is present (S604). In a case of presence the other jobnet to be executed just before the acquired jobnet (S604: YES), the prediction model creation program 105 executes processing in S605. In a case of absence of the other jobnet to be executed just before the acquired jobnet (S604: NO), the prediction model creation program 105 executes processing in S606.

In S605, the prediction model creation program 105 acquires the other jobnet and executes again the processing in S604 on the other jobnet. For example, the prediction model creation program 105 registers the ID of the other jobnet in a next item in the jobnet configuration item 172 in the record in the jobnet list table 170.

In S606, the prediction model creation program 105 stores a value indicating that the selected JN is the first jobnet in the jobnet list including the selected JN. For example, the prediction model creation program 105 sets "−1" to a last item in the jobnet configuration item 172 in the created record in the jobnet list table 170.

In a case of presence of the other jobnet that is not selected as the selected JN so far, the prediction model creation program 105 repeats the processing in and after S602 with the other jobnet defined as the new selected JN (S606). In a case of selecting all the jobnets as the selected JNs, the prediction model creation program 105 ends the jobnet list generation processing.

—Jobnet Execution Time Prediction Processing—

Figure 15:
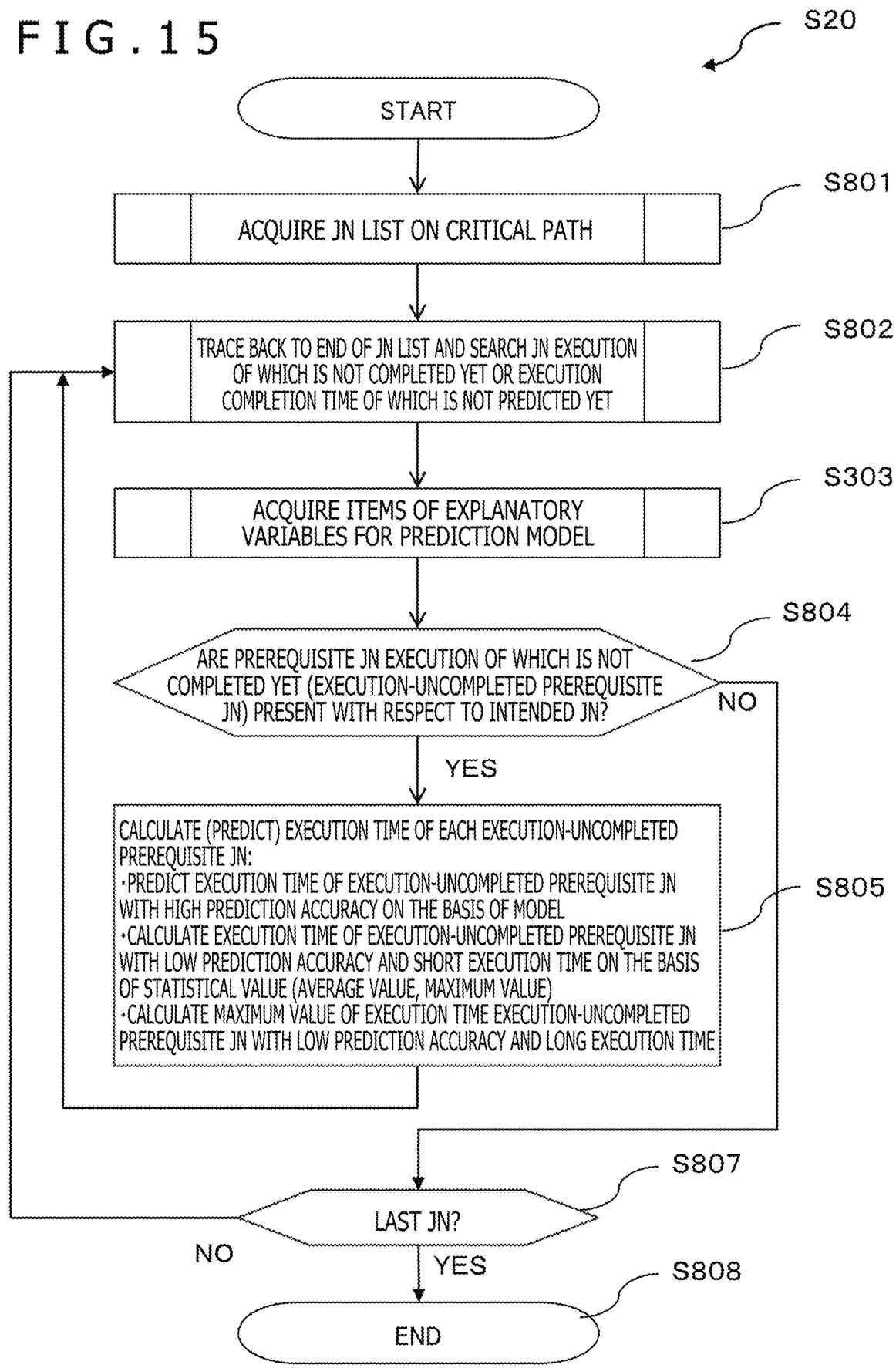
FIG. 15 is a flowchart illustrating details of jobnet execution time prediction processing.

FIG. 15 is a flowchart illustrating details of the jobnet execution time prediction processing S20. The jobnet execution time prediction processing S20 is repeatedly executed at predetermined timing (for example, at predetermined time intervals, at a predetermined time, or in a case of a predetermined input from the user) in a case in which the batch job is being executed after the jobnet information collection processing S10 is executed at least once.

First, the prediction model creation program 105 acquires information about each jobnet on the critical path identified in the critical path identifying processing S3 in the jobnet information collection processing S10 (S801).

Specifically, the prediction model creation program 105 acquires records related to the critical path from the jobnet list table 170 and the jobnet execution information management table 140.

The prediction model creation program 105 selects a jobnet (hereinafter, referred to as "jobnet to be predicted") searched first and not selected so far among the jobnets the execution of which is not completed yet or the execution time of which is not predicted yet by searching the jobnets from the first jobnet in the order of execution (S802) in a currently being executed batch job.

The prediction model creation program 105 acquires items of explanatory variables associated with the jobnet to be predicted for inputting the explanatory variables to the jobnet execution time prediction model in S805 to be described later (S803). For example, the prediction model creation program 105 acquires the items of the explanatory variables 152 from the jobnet execution time learning table 150.

The prediction model creation program 105 determines whether one or a plurality of jobnets (hereinafter, referred to as "execution-uncompleted prerequisite JNs") which are the prerequisite JNs for the jobnet to be predicted and the execution of which is not completed yet are present (S804).

Specifically, the prediction model creation program 105 identifies the jobnets earlier in order of execution than the jobnet selected in S802 by the jobnet list table 170, and confirms whether the execution of the identified jobnets is underway by a predetermined monitoring program.

In a case of presence of the execution-uncompleted prerequisite JNs (S804: YES), the prediction model creation program 105 executes processing in S805 to be described next. In a case of absence of the execution-uncompleted prerequisite JNs (S804: NO), the prediction model creation program 105 executes processing in S807 to be described later.

In S805, the prediction model creation program 105 predicts execution time of each execution-uncompleted prerequisite JN in response to the prediction method for each jobnet determined in the jobnet execution time prediction model generation processing S2. Subsequently, the prediction model creation program 105 selects a jobnet to be predicted next in order of execution and repeats the processing in and after S802.

Specifically, first, the prediction model creation program 105 acquires the jobnet execution time prediction method item 164 in the record related to the execution-uncompleted prerequisite JN from the jobnet execution time prediction method table 160.

In a case in which an acquired content is "Predict" (the prediction accuracy is high), the prediction model creation program 105 predicts the execution time of each execution-uncompleted prerequisite JN using a measured value of the execution time of each execution-completed prerequisite JN and values of the explanatory variables associated with each execution-uncompleted prerequisite JN and acquired in S303 as input values to the jobnet execution time prediction model (the jobnet execution time prediction model created from the jobnet execution time learning table 150).

Furthermore, in a case in which the acquired content is "Calculate" (the prediction accuracy is low and the execution time is short), the prediction model creation program 105 calculates the execution time of each execution-uncompleted prerequisite JN on the basis of the statistical information about each previously executed execution-uncompleted prerequisite JN. For example, the prediction model creation program 105 predicts (calculates) the execution time of each execution-uncompleted prerequisite JN by acquiring the average execution time item 143 or the jobnet maximum execution time item 144 in the record related to each execution-uncompleted prerequisite JN from the jobnet execution information management table 140.

It is noted that whether to use the average execution time item 143 or the jobnet maximum execution time item 144 is changed depending on, for example, a volume of data in a previous history (the number of samples) of the jobnets used at the time of creating the jobnet execution information management table 140. For example, the prediction model creation program 105 uses the jobnet average execution time item 143 in a case in which the number of samples is larger than a predetermined number, and uses the jobnet maximum execution time item 144 in a case in which the number of samples is smaller than the predetermined number.

Moreover, in a case in which the acquired content is "Wait" (the prediction accuracy is low and the execution time is long), the prediction model creation program 105 predicts (calculates) the execution time of each execution-uncompleted prerequisite JN on the basis of the maximum value of the statistical information about each previously executed execution-uncompleted prerequisite JN. For example, the prediction model creation program 105 predicts the execution time of each execution-uncompleted prerequisite JN by acquiring the jobnet maximum execution time item 144 in the record related to each execution-uncompleted prerequisite JN from the jobnet execution information management table 140.

In S807, the prediction model creation program 105 confirms whether selection of all selectable jobnets to be predicted is completed. The prediction model creation program 105 ends the jobnet execution time prediction processing (S808) in a case of selecting all the jobnets to be predicted (S807: YES), and selects the previous jobnet to be predicted and repeats the processing in and after S802 in a case of presence of an unselected jobnet to be predicted (S807: NO).

In this way, the jobnet execution time prediction processing S20 calculates (predicts) the execution time of each execution-uncompleted prerequisite JN in the batch job currently being executed.

—Jobnet Delay Determination Processing—

Figure 16:
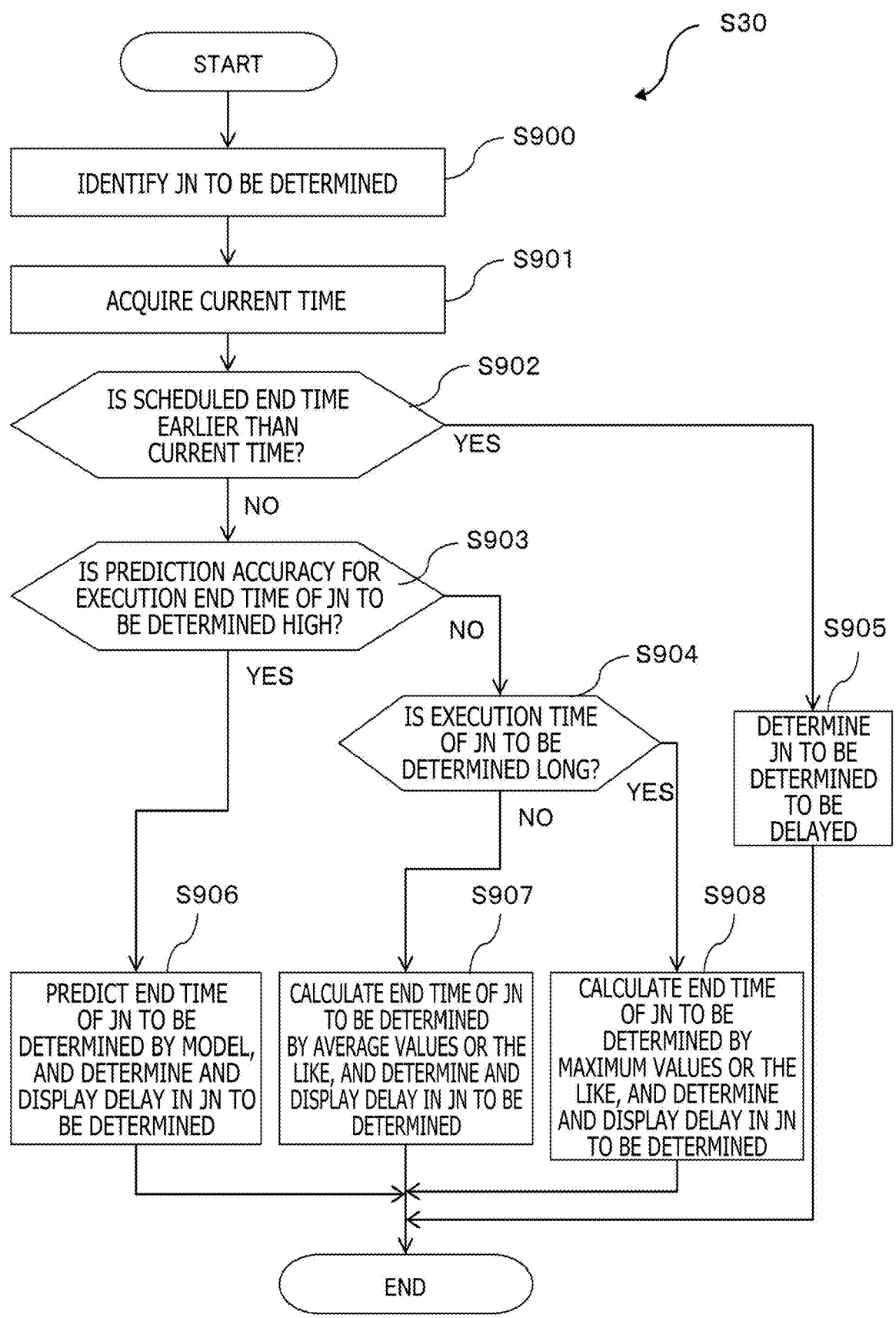
FIG. 16 is a flowchart illustrating details of jobnet delay determination processing.

Next, FIG. 16 is a flowchart illustrating details of the jobnet delay determination processing S30. In the jobnet delay determination processing S30, information associated with a progress situation (delay situation) of an execution end time of the user designated jobnet is displayed using the execution time calculated in the jobnet execution time prediction processing S20.

It is noted that the jobnet delay determination processing S30 is executed in a case of a predetermined input from the user, in a case of receiving a notification indicating an end of execution of any of the jobnets that is being executed from the job execution manager 500, or at predetermined timing (for example, at predetermined time intervals or at a predetermined time) while the batch job is being executed after the jobnet execution time prediction processing S20 is executed at least once.

First, the delay determination program 109 identifies a jobnet (hereinafter, referred to as "JN to be determined") for which an execution delay situation is determined among the jobnets on the critical path of the batch job currently being executed (S900).

Specifically, the delay determination program 109 may receive an input of designation of the JN to be determined from the user on a jobnet monitoring window 1000 to be described later, may optionally select the JN to be determined from the jobnets, or select the JN to be determined according to a predetermined schedule.

The delay determination program 109 acquires a current time (S901). The delay determination program 109 then determines whether an execution end time (hereinafter, referred to as "scheduled end time") of the JN to be determined set by the user in advance is earlier than the current time (S902).

It is noted that the scheduled end time is, for example, a time set by the user in response to a job situation or the like, or a time automatically set on the basis of a predetermined schedule.

The delay determination program 109 executes processing in S905 to be described next in a case in which the scheduled end time is earlier than the current time (S902: YES), and executes processing in S903 to be described later in a case in which the scheduled end time is equal to or later than the current time (S902: NO).

In S905, the delay determination program 109 displays information indicating that processing on the JN to be determined is delayed from the scheduled end time. That is all for the jobnet delay determination processing S30.

On the other hand, in S903, the delay determination program 109 determines whether the prediction accuracy for the execution time of the JN to be determined is high. For example, the delay determination program 109 determines whether the jobnet prediction accuracy class item 163 in the record related to the JN to be determined in the jobnet execution time prediction method table 160 is "High."

The prediction accuracy delay determination program 109 executes processing in S906 to be described later in a case in which the prediction accuracy for the execution time of the JN to be determined is high (S903: YES), and executes processing in S904 to be described later in a case in which the prediction accuracy for the execution time of the JN to be determined is not high (S903: NO).

In S906, the delay determination program 109 calculates an execution end time of the JN to be determined on the basis of the jobnet execution time prediction model. The delay determination program 109 then displays information indicating a delay situation of the processing on the JN to be determined on the jobnet monitoring window 1000 to be described later, and ends the jobnet delay determination processing S30.

Specifically, the delay determination program 109 acquires, for example, prerequisite JNs for the JN to be determined in the order of execution. In a case in which each of the acquired prerequisite JNs is an execution-uncompleted prerequisite JN, the delay determination program 109 acquires a predicted value of the execution time of the execution-uncompleted prerequisite JN (calculated in the jobnet execution time prediction processing S20). On the other hand, in a case in which each prerequisite JN is not the execution-uncompleted prerequisite JN, the delay determination program 109 acquires a measured value of the execution time of the prerequisite JN.

The delay determination program 109 calculates the execution end time of the JN to be determined by predicting the execution time thereof by inputting the execution time of each acquired prerequisite JN and other explanatory variables (for example, the execution day of week, the average wait time item 146 in the jobnet execution information management table 140, or the wait time acquired by the prediction model created based on the jobnet wait time learning table 220) as the explanatory variables into the jobnet execution time prediction model, and displays this calculated execution end time.

Furthermore, in a case in which the calculated execution end time is later than the scheduled end time, the delay determination program 109 may display information indicating that the processing on the JN to be determined is delayed.

In S904, the delay determination program 109 determines whether the execution time of the JN to be determined is long. For example, the delay determination program 109 determines whether a record related to the JN to be determined and containing the jobnet execution time class item 162 to which "Long" is set is present in the jobnet execution time prediction method table 160.

The delay determination program 109 executes processing in S908 to be described later in a case in which the execution time is long (S904: YES), and executes processing in S907 to be described later in a case in which the execution time is not long (S904: NO).

In S907, the delay determination program 109 predicts the execution end time of the JN to be determined on the basis of the average values or the measured values of the execution time of the JN to be determined and each prerequisite JN. The delay determination program 109 then displays the information indicating the delay situation of the processing on the JN to be determined on the jobnet monitoring window 1000 to be described later, and ends the jobnet delay determination processing S30.

Specifically, the delay determination program 109 acquires, for example, the prerequisite JNs for the JN to be determined in the order of execution. In a case in which each of the acquired prerequisite JNs is an execution-uncompleted prerequisite JN, the delay determination program 109 acquires the predicted value of the execution time of the execution-uncompleted prerequisite JN (calculated in the jobnet execution time prediction processing S20). Meanwhile, in a case in which each prerequisite JN is not the execution-uncompleted prerequisite JN, the delay determination program 109 acquires the measured value of the execution time of the prerequisite JN.

Furthermore, the delay determination program 109 acquires the execution time of the JN to be determined from the jobnet average execution time item 143 in the corresponding record in the jobnet execution information management table 140.

The delay determination program 109 calculates the execution end time of the JN to be determined by summing up the execution time of each acquired prerequisite JN and the JN to be determined.

It is noted that the delay determination program 109 may acquire wait time between the prerequisite JNs and wait time between the JN to be determined and each prerequisite JN using an average value or a maximum value of the wait time obtained from the start times and the end times in the records corresponding to the JN to be determined and each prerequisite JN in the jobnet execution history management table 130, or using a prediction model created based on the jobnet wait time learning table 220, and may further add the wait time.

It is noted that the delay determination program 109 may display information indicating that accuracy for the calculated execution end time of the JN to be determined is low on the jobnet monitoring window 1000.

In S908, the delay determination program 109 predicts the execution end time of the JN to be determined on the basis of the maximum values or the measured values of the execution time of the JN to be determined and each prerequisite JN. The delay determination program 109 then displays the information indicating the delay situation of the processing on the JN to be determined on the jobnet monitoring window 1000 to be described later, and ends the jobnet delay determination processing S30.

Specifically, the delay determination program 109 acquires, for example, the prerequisite JNs for the JN to be determined in the order of execution. In the case in which each of the acquired prerequisite JNs is an execution-uncompleted prerequisite JN, the delay determination program 109 acquires the predicted value of the execution time of the execution-uncompleted prerequisite JN (calculated in the jobnet execution time prediction processing S20). Meanwhile, in the case in which each prerequisite JN is not the execution-uncompleted prerequisite JN, the delay determination program 109 acquires the measured value of the execution time of the prerequisite JN.

Furthermore, the delay determination program 109 acquires the execution time of the JN to be determined from the jobnet maximum execution time item 144 in the corresponding record in the jobnet execution information management table 140.

The delay determination program 109 calculates the execution end time of the JN to be determined by summing up the execution time of each acquired prerequisite JN and the JN to be determined.

It is noted that the delay determination program 109 may acquire the wait time between the prerequisite JNs and the wait time between the JN to be determined and each prerequisite JN from the average wait time items 146 in the corresponding records in the jobnet execution information management table 140 or from the corresponding feature amounts in the jobnet wait time learning table 220, and may further add the wait time.

It is noted that the delay determination program 109 may display information indicating that accuracy for the calculated execution end clock time of the JN to be determined is low on the jobnet monitoring window 1000. Furthermore, the delay determination program 109 may wait (defer the display of the execution end time of the JN to be determined) for a predetermined period of time.

In this way, the jobnet delay determination processing S30 in the present embodiment changes the display of the information related to delay determination depending on the degree of the prediction accuracy and the length of the execution time of each of the jobnet to be determined and each execution-uncompleted prerequisite JN.

The jobnet monitoring window 1000 will now be described.

(Jobnet Monitoring Window)

Figure 17:
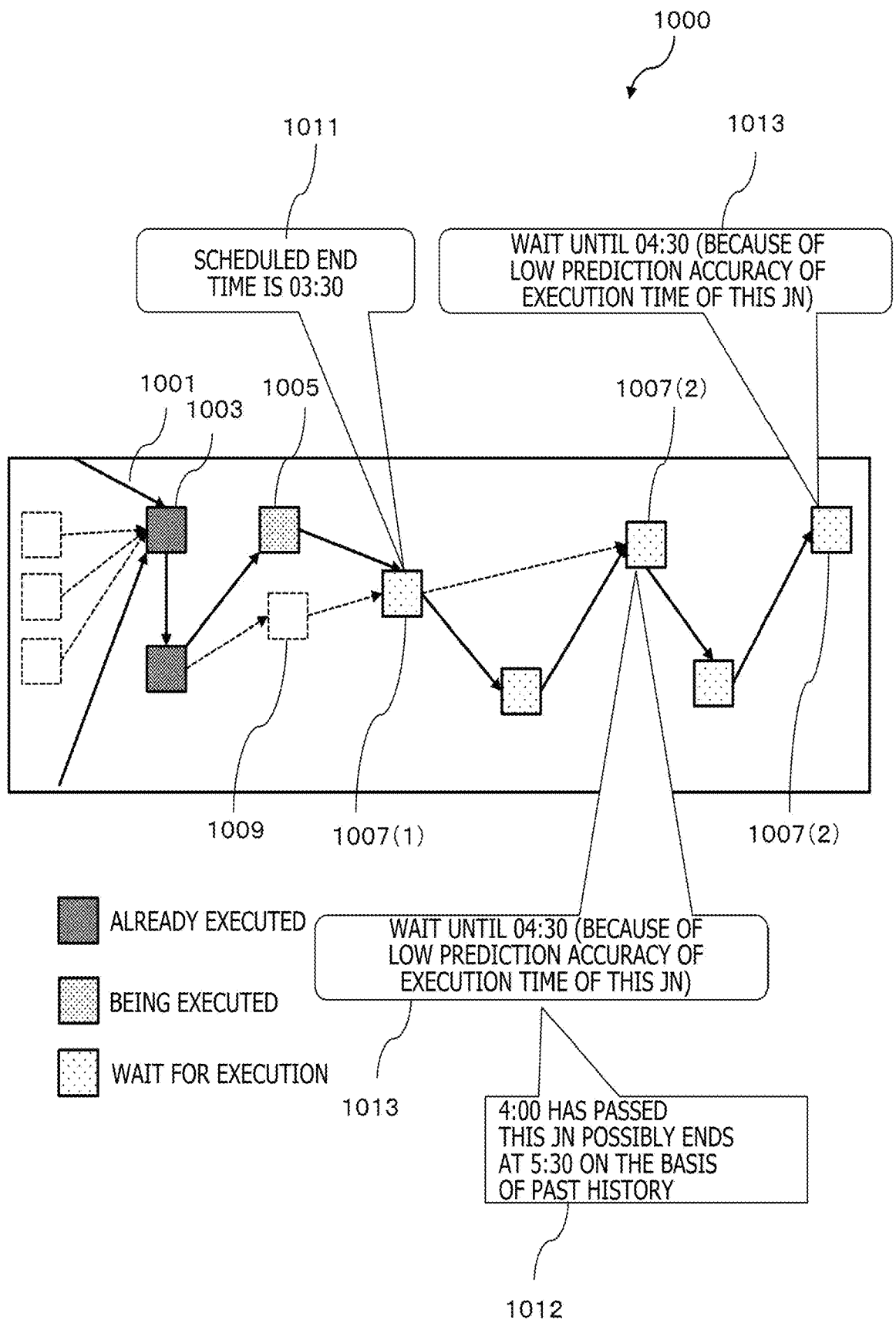
FIG. 17 is a diagram depicting an example of a jobnet monitoring window.

FIG. 17 is a diagram depicting an example of the jobnet monitoring window 1000. On the jobnet monitoring window 1000, icons of the jobnets on the critical path and a graphic 1001 (arrows and the like) indicating the order of executing the jobnets are displayed. Specifically, types of icons of the jobnets include an already-executed icon 1003 indicating that the jobnet is already executed, a being-executed icon 1005 indicating that the jobnet is being executed, and an unexecuted icon 1007 indicating that the jobnet is unexecuted (waits for execution). It is noted that an icon 1009 of the jobnet that does not belong to the critical path is displayed in a special manner (for example, displayed in a tinted color) so that the jobnet does not belong to the critical path.

Here, when the user selects the unexecuted icon 1007 (1007(1) or 1007(2)) as the JN to be determined, information indicating the delay situation of the jobnet corresponding to the unexecuted icon 1007 is displayed.

Specifically, in a case, for example, in which the prediction accuracy for the execution end time of the jobnet corresponding to the selected unexecuted icon 1007(1) is high, an execution end time 1011 predicted by the jobnet execution time prediction model or the measured value is displayed as an execution end time of the jobnet corresponding to the unexecuted icon 1007(1).

Furthermore, in a case, for example, in which the prediction accuracy for the execution end time of the jobnet corresponding to the selected unexecuted icon 1007(2) is low, an execution end time 1012 predicted by the statistical information (the average value, the maximum value, or the like) is displayed as an execution end time of the jobnet corresponding to the unexecuted icon 1007(2).

It is noted that in this case, information 1013 indicating that the prediction accuracy for the execution end time 1011 is low may be displayed. Furthermore, the predicted execution end time 1012 may be set undisplayed. Moreover, in this case, the display of the execution end time 1011 may be set on standby for a predetermined period of time. For example, the execution end time 1012 may be set undisplayed until execution of the jobnet corresponding to the unexecuted icon 1007(2) is started, until a scheduled end time of the jobnet comes, or until an execution end time of the jobnet predicted using the minimum value in the statistical information comes.

It is noted that each information is displayed similarly to the case of the unexecuted icon 1007 in a case in which the user selects the being-executed icon 1005 as the JN to be determined.

A jobnet scheduled end time input window 1100 will next be described.

(Jobnet Scheduled End Time Input Window)

Figure 18:
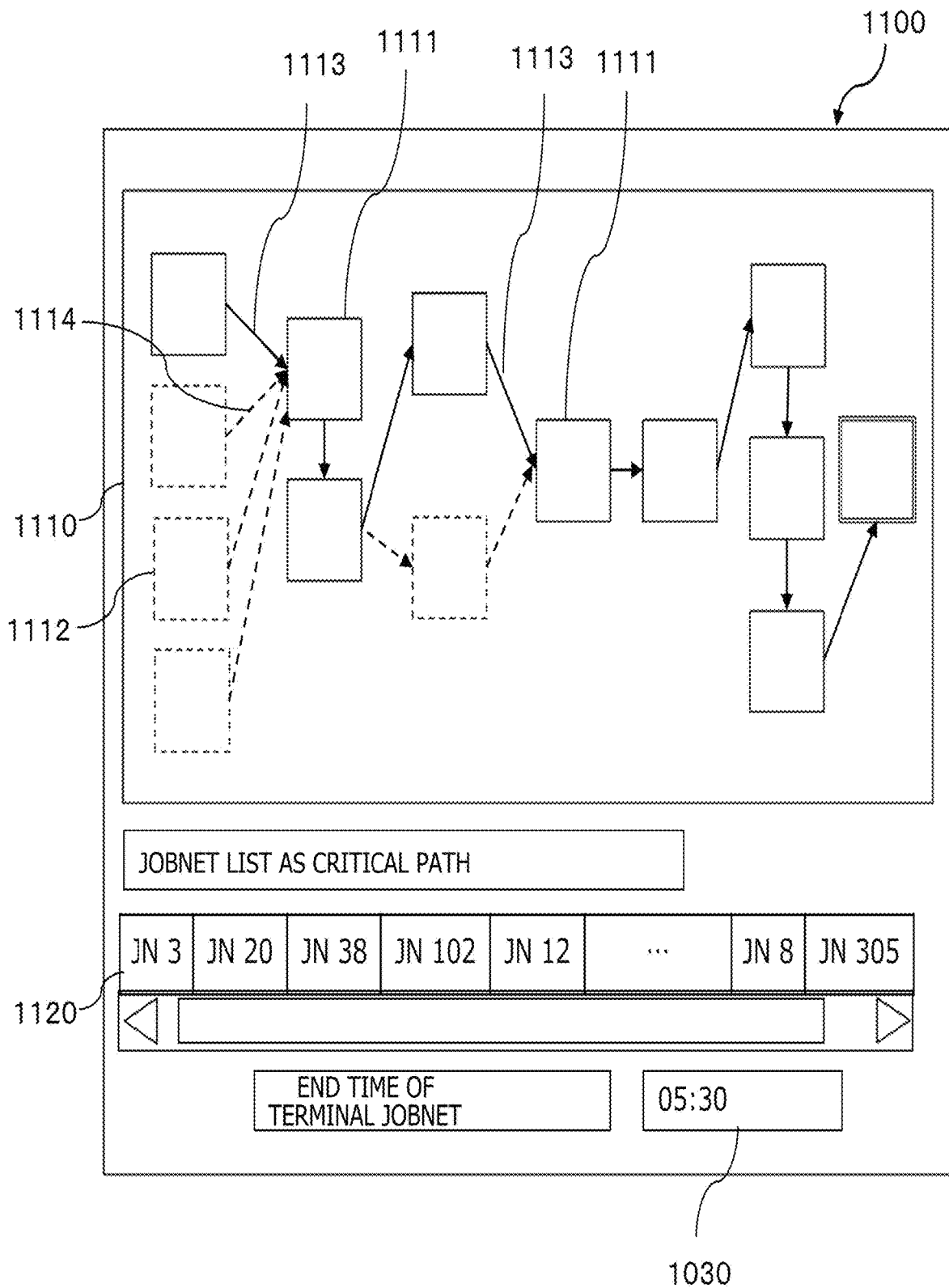
FIG. 18 is a diagram depicting an example of a jobnet scheduled end time input window.

FIG. 18 is a diagram depicting an example of the jobnet scheduled end time input window 1100. On the jobnet scheduled end time input window 1100, a job display block 1110 where jobnets 1111 on the critical path and information 1113 (arrows) indicating the order of executing these jobnets 1111 are displayed, a list display block 1120 of a list of the jobnets 1111 on the critical path, and a setting time input block 1130 that receives an input of a scheduled end time of the last jobnet on the critical path from the user are displayed.

(Jobnet Information Display Window)

Figure 19:
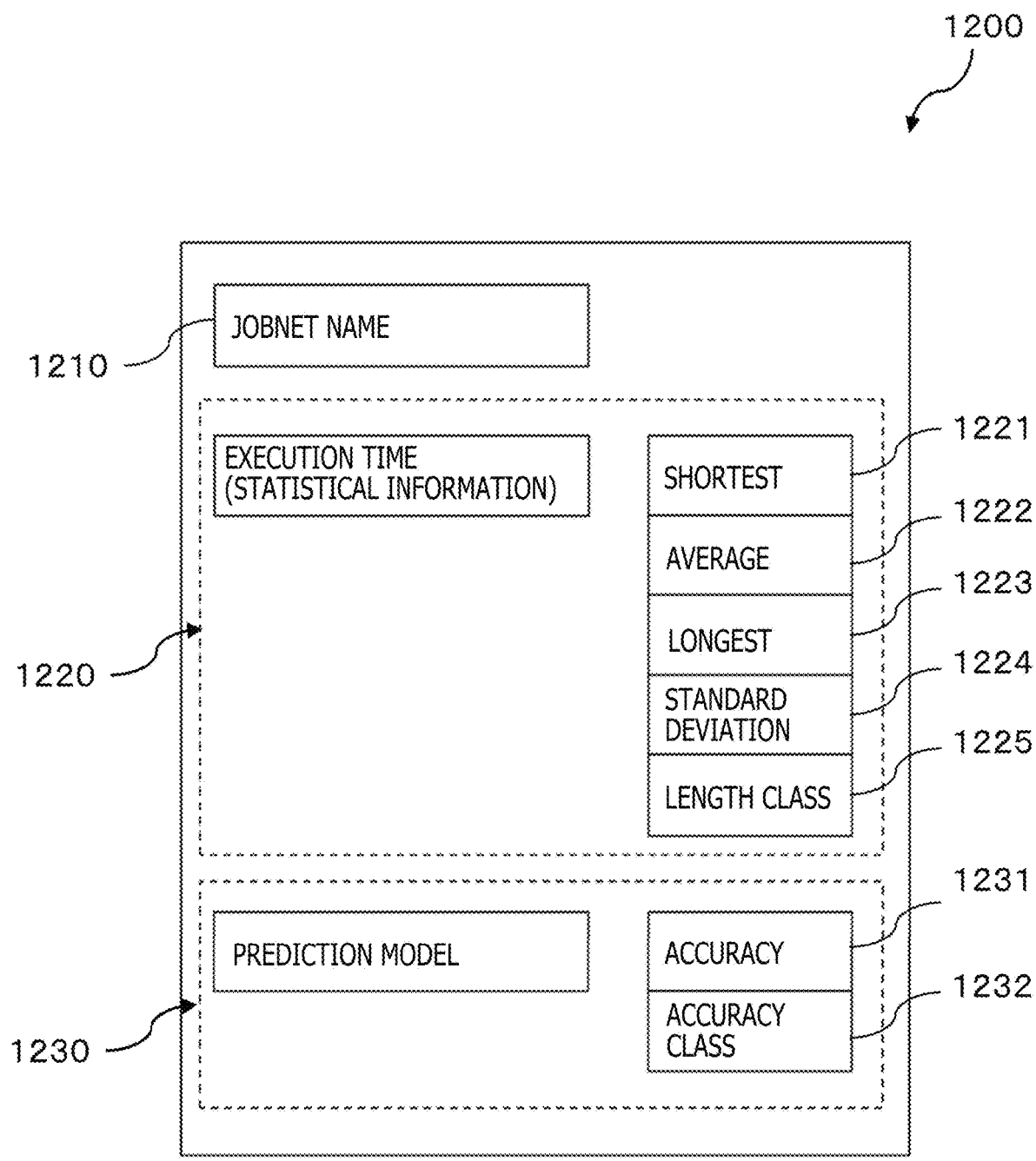
FIG. 19 is a diagram depicting an example of a jobnet information display window.

FIG. 19 is a diagram depicting an example of a jobnet information display window 1200.

The jobnet information display window 1200 is displayed when, for example, the job management apparatus 100 receives a predetermined input from the user. The jobnet information display window 1200 is a window provided per jobnet, and a name 1210 of a jobnet, statistical information 1220 about the jobnet, and accuracy information 1230 about the jobnet execution time prediction model in relation to the jobnet are displayed.

The statistical information 1220 is information based on the jobnet execution history management table 130 and the jobnet execution information management table 140, and specifically contains shortest execution time 1221 out of the execution time of the jobnet executed so far, average execution time 1222 of the jobnet executed so far, longest execution time 1223 out of the execution time of the jobnet executed so far, a standard deviation 1224 of the execution time of the jobnet executed so far, and a length class 1225 (corresponding to "Long" or "Short) of the execution time of the jobnet.

The accuracy information 1230 is information based on the jobnet execution time prediction method table 160, and specifically contains prediction accuracy 1231 (corresponding to "High" or "Low") for the jobnet execution time prediction model associated with the jobnet, and a prediction method 1232 (corresponding to "Predict," "Low," or "Wait") of the execution time of the jobnet.

As described so far, the job management apparatus 100 according to the present embodiment calculates the prediction accuracy for the execution time of each job (or jobnet, the same applies hereinafter) to be executed by the execution time prediction model predicting the execution time of the job to be executed, determines whether to predict the execution end timing of a designated job in a batch job currently being executed based on the execution time prediction model by determining based on the prediction accuracy for the execution time of each job, and displays information associated with the execution end timing of the designated job predicted based on the execution time prediction model in a case of predicting the execution end timing of the designated job on the basis of the execution time prediction model.

In other words, the job management apparatus 100 predicts the execution end time of each job (jobnet) in response to the accuracy of the execution time prediction model, and can, therefore, predict the execution end timing of the job (jobnet) with stable accuracy.

As a result, in a case, for example, in which start, end, or a progress situation of each jobnet is monitored and the end of executing the jobnet appears to be delayed, it is possible to detect this state as soon as possible and encourage the user to take necessary measures. It is thereby possible to complete necessary job processing before an operation start time of, for example, a business system using jobs.

Second Embodiment

A job management system 2 according to a second embodiment differs from the job management system 1 according to the first embodiment in explanatory variables in the jobnet execution time prediction model. In other words, in the job management system 2 according to the present embodiment, information about resources of the job execution agents 600 is added as the explanatory variables.

Figure 20:
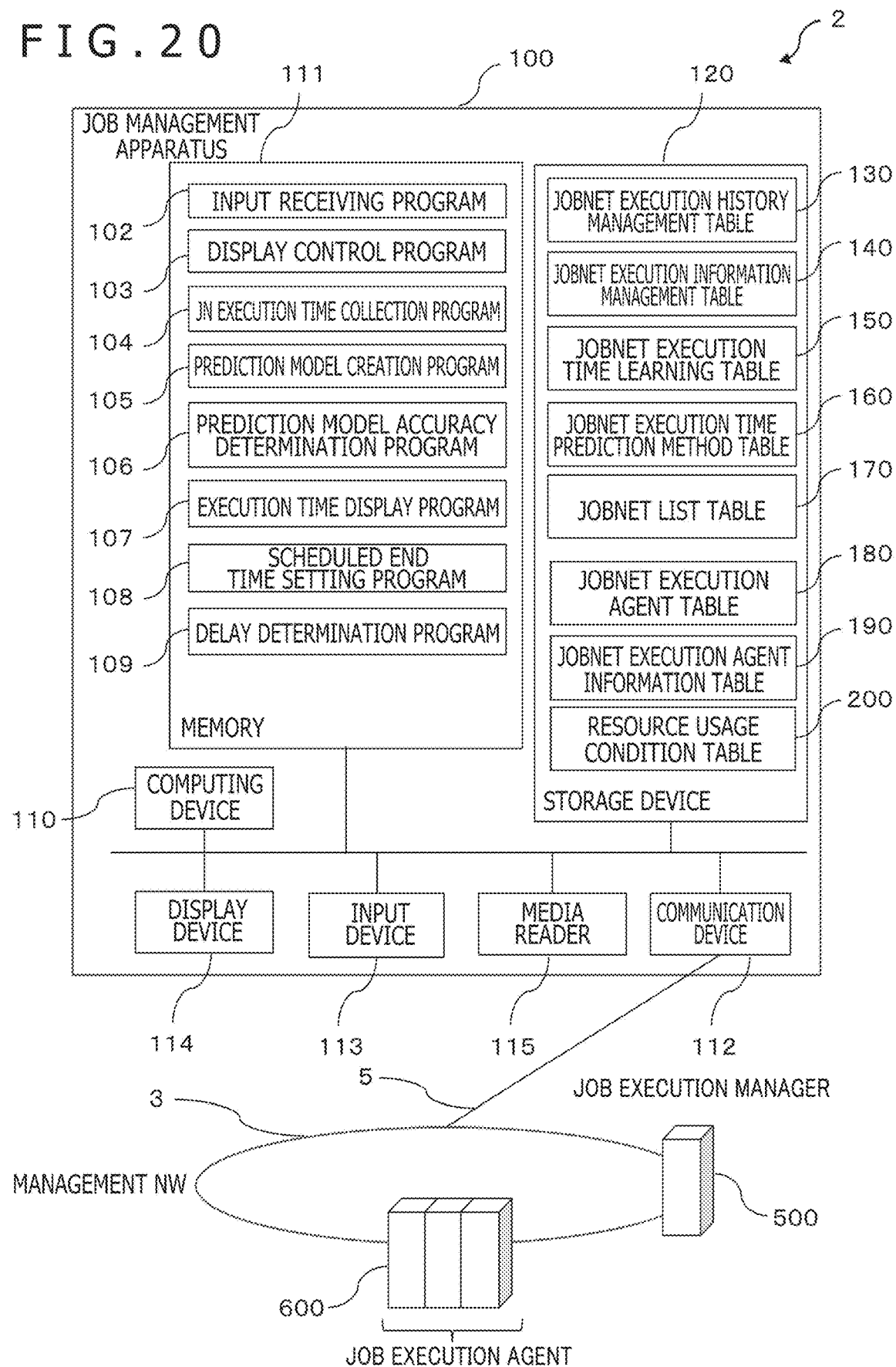
FIG. 20 is a diagram illustrating an example of configurations of a batch job management system according to a second embodiment.

FIG. 20 is a diagram depicting an example of configurations of the job management system 2 according to the second embodiment. Configurations denoted by similar reference characters as those in the first embodiment are similar to those in the first embodiment.

In other words, the job management apparatus 100 according to the present embodiment stores a jobnet execution agent table 180, a jobnet execution agent information table 190, and a resource usage condition table 200.

Furthermore, in the present embodiment, the prediction model creation program 105 acquires information about a usage condition of resources of each job execution agent 600 previously executing each job at a time of executing the job, and generates the execution time prediction model on the basis of the acquired information about the usage condition of the resources (resource usage condition table 200) and information associated with the execution time of each job previously executed.

The jobnet execution agent table 180 and the jobnet execution agent information table 190 will now be described.

(Jobnet Execution Agent Table)

Figure 21:
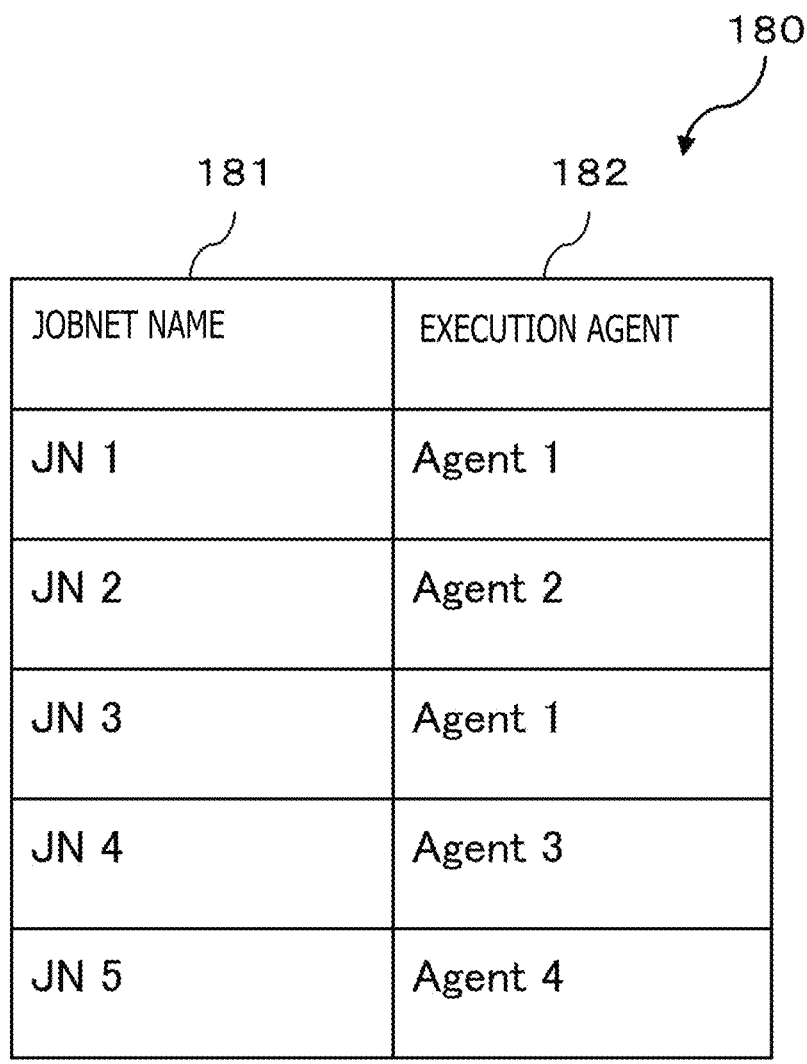
FIG. 21 is a diagram depicting an example of a jobnet execution agent table.

FIG. 21 is a diagram depicting an example of the jobnet execution agent table 180. The jobnet execution agent table 180 is configured with records each having items including a jobnet name item 181 that is a name (an identifier) of each jobnet, and an agent item 182 that is an identifier of each job execution agent 600 executing a jobnet related to the jobnet name item 181.

(Jobnet Execution Agent Information Table)

Figure 22:
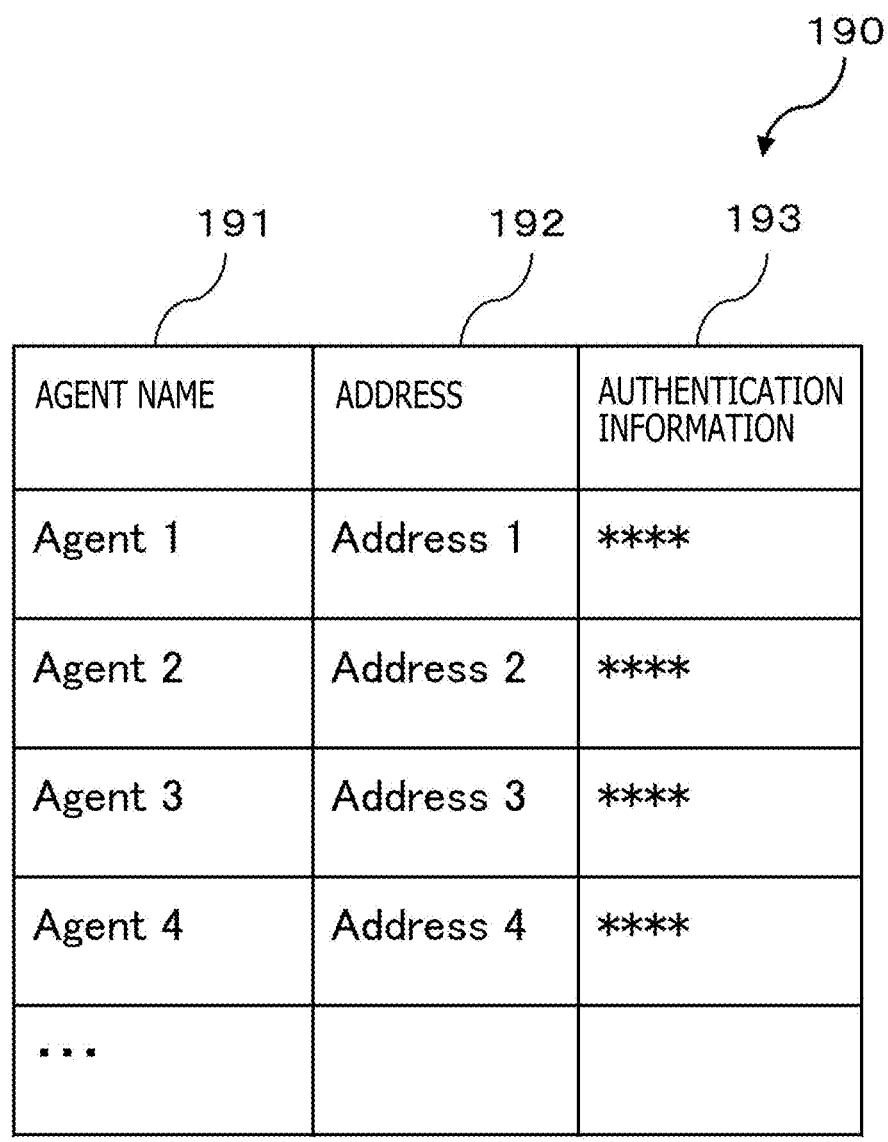
FIG. 22 is a diagram depicting an example of a jobnet execution agent information table.

FIG. 22 is a diagram depicting an example of the jobnet execution agent information table 190. The jobnet execution agent information table 190 is configured with records each having items including an agent name item 191 that is a name (an identifier) of each job execution agent 600, an address item 192 that is a position (an IP address or the like) of the job execution agent 600 related to the agent name item 191 on the job management system 2, and an authentication information item 193 necessary to access the job execution agent 600 related to the agent name item 191.

—Jobnet Execution Time Collection Processing—

Figure 23:
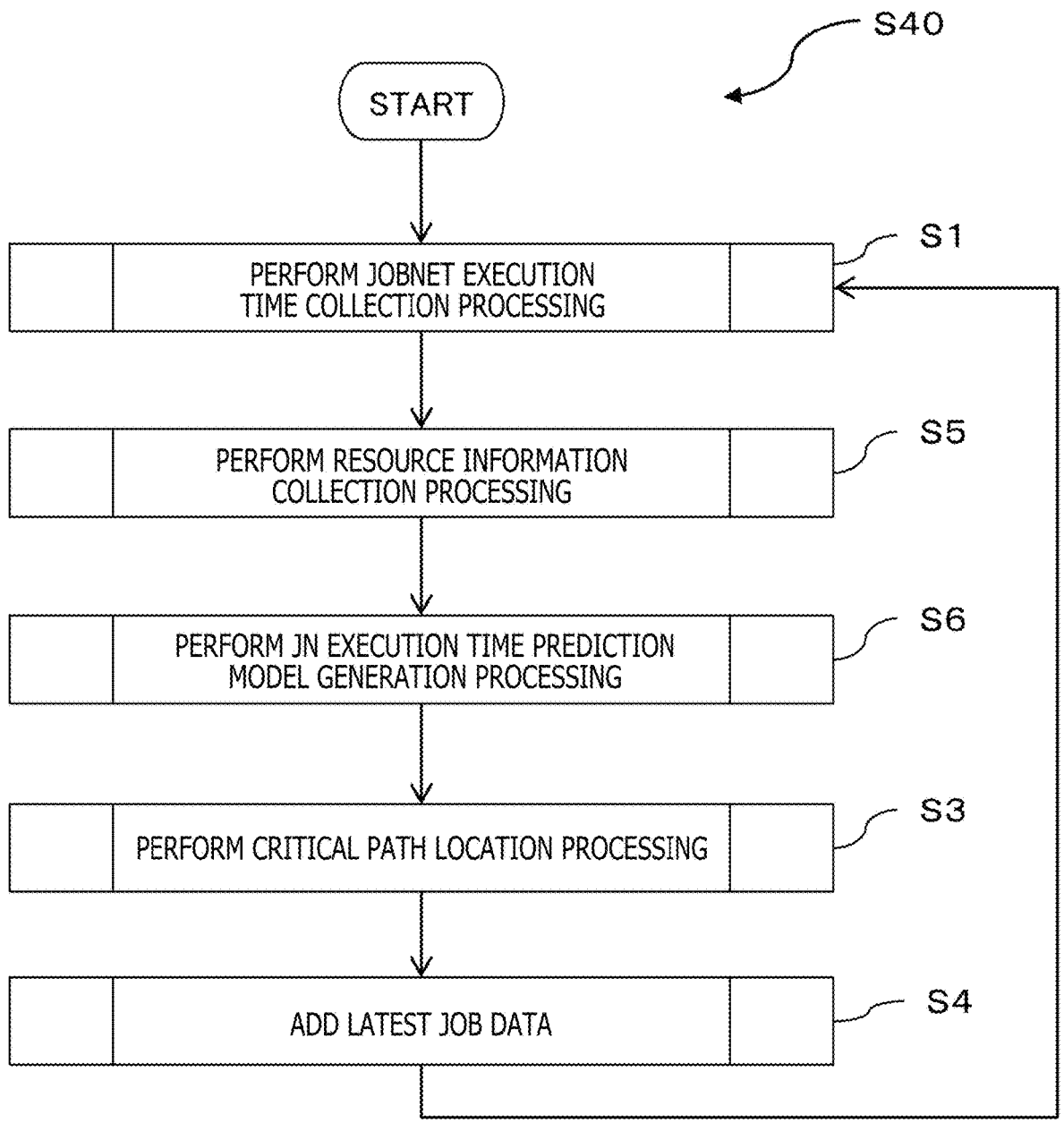
FIG. 23 is a diagram illustrating an example of a jobnet execution time collection processing according to a second embodiment.

FIG. 23 illustrates an example of jobnet execution time collection processing S40 according to the second embodiment. In this jobnet execution time collection processing S40, the jobnet execution time collection processing S1 similar to that according to the first embodiment, jobnet execution time prediction model creation processing S6 to be described later, the critical path identifying processing S3 similar to that according to the first embodiment, and data addition S4 similar to that according to the first embodiment are executed, and resource information collection processing S5 collecting resource information associated with each job execution agent 600 is also executed before executing the jobnet execution time prediction model generation processing S6.

In other words, in the resource information collection processing S5, the jobnet execution time collection program 104 not only executes the series of processing according to the first embodiment but also receives resource information associated with each job execution agent 600 from the job execution agent 600, and stores the received information in the resource usage condition table 200.

(Resource Usage Condition Table)

Figure 24:
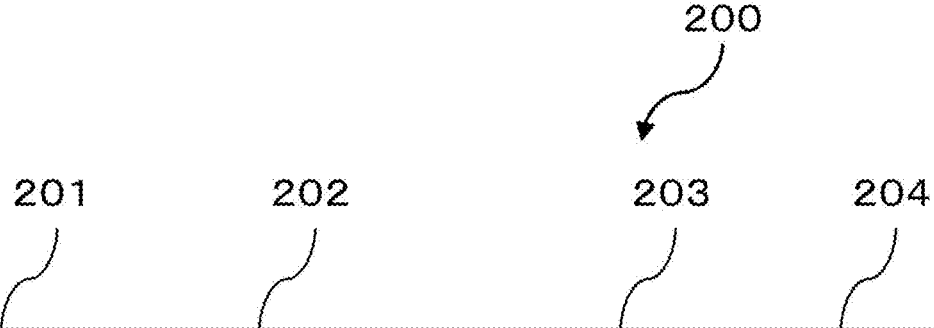
FIG. 24 is a diagram depicting an example of a resource usage condition table.

FIG. 24 is a diagram depicting an example of the resource usage condition table 200. The resource usage condition table 200 is configured with records each having items including an agent name item 201 that is a name (an identifier) related to each job execution agent 600, a date item 202 at which the job execution agent 600 related to the agent name item 201 executes a jobnet, a resource name item 203 that is a name (an identifier) of a type of resource (for example, a CPU usage rate, a memory usage rate, a disk usage rate, or a network bandwidth usage rate) in the job execution agent 600 related to the agent name item 201, and a value item 204 of the resource related to the resource name item 203 at a point in time related to the date 202.

The jobnet execution time prediction model generation processing S6 according to the present embodiment will next be described.

In the jobnet execution time prediction model generation processing S6, the prediction model creation program 105 generates a jobnet execution time learning table 230 different from the jobnet execution time learning table 150 according to the first embodiment by generating a jobnet execution time prediction model similarly to the first embodiment. In other words, in the present embodiment, the prediction model creation program 105 uses resource information about each job execution agent 600 in addition to the explanatory variables described in the first embodiment as explanatory variables for the jobnet execution time prediction model.

(Jobnet Execution Time Learning Table)

FIG. 25 is a diagram depicting an example of the jobnet execution time learning table 230 according to the second embodiment. The jobnet execution time learning table 230 is information that stores combinations of a series of execution time 151 of each jobnet as objective variables for the jobnet execution time prediction model and explanatory variables 152 explaining the execution time 151 of each jobnet, and values 154 of the explanatory variables for the combinations, similarly to the first embodiment. In the present embodiment, resources 235 of each job execution agent 600 (the CPU usage rate and the memory usage rate in the example of FIG. 25) are set as the explanatory variables 152.

The delay determination program 109 executes the jobnet execution time prediction processing S20 and the jobnet delay determination processing S30 using this jobnet execution time learning table 230.

The present invention is not limited to the embodiments described above and encompasses various modifications. The above embodiments are described in detail for better understanding of the present invention and the present invention is not always limited to the invention configured with all the configurations described above.

For example, part of or entirety of functions of each information processing apparatus may be provided in the other information processing apparatus.

Furthermore, while the execution time, the execution end time, or the like is calculated per jobnet in the present embodiments, the execution time, the execution end time, or the like may be calculated per job or a higher job group obtained by further integrating the jobnets.

Moreover, the explanatory variables for the jobnet execution time prediction model are not limited to those described in the present embodiments. Furthermore, the jobnets for the explanatory variables may be limited to part of the jobnets.

Moreover, while the prediction accuracy of the jobnet execution time prediction model and the execution time of each jobnet are used as criteria for determination as to whether the prediction is based on the jobnet execution time prediction model or on the statistical information, the other criteria for determination may be used. For example, a proportion of the execution of each jobnet on the entire path may be used.

Moreover, the scheduled end time may be set per jobnet or may be an end time of the entire path.

At least the following respects are made clear from the description of the present specification given above. In other words, in the present embodiments, in the delay determination processing, the information processing apparatus (job management apparatus 100) may determine whether to predict the execution end timing of the designated jobnet based on the execution time prediction model by determining whether the prediction accuracy for the execution time of the designated jobnet is equal to or higher than a predetermined value, and display the information associated with the execution end timing of the designated jobnet predicted on the basis of the execution time prediction model in a case of determining that the prediction accuracy for the execution time is equal to or higher than the predetermined value.

In this way, displaying the information associated with the execution end timing of the designated jobnet predicted based on the execution time prediction model in the case in which the prediction accuracy for the execution time of the designated jobnet is high by the execution time prediction model makes it possible to ensure that highly reliable information about the execution end time of the designated jobnet is provided to the user.

Furthermore, in the present embodiments, the information processing apparatus may execute jobnet execution time collection processing for calculating a statistical value of the execution time of each of the jobnets on the basis of the information associated with the execution time of each of the previously executed jobnets, and, in the delay determination processing, the information processing apparatus may determine whether to predict the execution end timing of the designated jobnet based on the execution time prediction model by determining whether the prediction accuracy for the execution time of the designated jobnet is equal to or higher than the predetermined value, and may display the information associated with the execution end timing of the designated jobnet calculated based on the calculated statistical value in a case of determining that the prediction accuracy for the execution time is not equal to or higher than the predetermined value.

In this way, displaying the information associated with the execution end timing of the designated jobnet calculated based on the statistical value of the execution time of each of the jobnets in a case in which the prediction accuracy for the execution time is not high makes it possible for the user to receive presentation of the execution end time by an appropriate prediction method even in the case in which the prediction accuracy is not high.

Moreover, in the delay determination processing, the information processing apparatus may wait for a predetermined period of time before displaying the information associated with the execution end timing of the designated jobnet calculated based on the calculated statistical value in the case of determining that the prediction accuracy for the execution time of the designated jobnet is not equal to or higher than the predetermined value.

In this way, waiting for a predetermined period of time before displaying the information associated with the execution end timing calculated based on the calculated statistical value in the case in which the prediction accuracy for the execution time is not high makes it possible to prevent the user from making rough-and-ready determination based on inaccurate information in relation to prediction of the execution time.

Furthermore, in the present embodiments, in the jobnet execution time collection processing, the information processing apparatus may calculate, as the statistical value of the execution time of each of the jobnets, an average value and a maximum value of the execution time of each of the jobnets on the basis of the information associated with the execution time of each of the previously executed jobnets, and in the delay determination processing, the information processing apparatus may further determine whether the execution time of the designated jobnet is equal to or longer than predetermined time in the case of determining that the prediction accuracy for the execution time is not equal to or higher than the predetermined value, display the information associated with the execution end timing of the designated jobnet calculated based on the calculated maximum value in a case of determining that the execution time of the designated jobnet is equal to or longer than the predetermined time, and display the information associated with the execution end timing of the designated jobnet calculated based on the calculated average value in a case of determining that the execution time of the designated jobnet is not equal to or longer than the predetermined time.

In this way, displaying the information associated with the execution end timing of the designated jobnet calculated based on the maximum value in the case in which the prediction accuracy for the execution time of the designated jobnet is not high and further in the case in which the execution time of the jobnet is long, and, meanwhile, displaying the information associated with the execution end timing of the designated jobnet calculated based on the average value in the case in which the execution time is not long make it possible to provide reasonable information in response to the length of the execution time and associated with the execution end timing of the designated jobnet.

Moreover, in the present embodiments, in the jobnet execution time prediction model creation processing, the information processing apparatus may estimate an order of executing the jobnets on the basis of the information associated with execution time of each of the previously executed jobnets, and in the delay determination processing, the information processing apparatus may identify a jobnet earlier than the designated jobnet in the order of executing the jobnets on the basis of the estimated order of executing the jobnets.

In this way, estimating the order of executing the jobnets on the basis of the information associated with execution time of each of the previously executed jobnets, and identifying the jobnet earlier than the designated jobnet in the order of executing the jobnets on the basis of the estimated order of executing the jobnets make it possible to appropriately estimate the order of executing the jobnets and appropriately calculate the execution end time of the designated jobnet even in a case in which an order-of-execution relation among the jobnets is complicated.

Furthermore, in the present embodiments, in the jobnet execution time prediction model generation processing, the information processing apparatus may calculate, as one piece of the information associated with the execution time of each of the previously executed jobnets, a difference between an execution start time of each of the previously executed jobnets and an execution end time of other jobnet execution of which is ended before execution of each of the jobnets, and generate the execution time prediction model on the basis of the calculated wait time.

In this way, generating the execution time prediction model on the basis of the difference between the execution start time of each of the previously executed jobnets and the execution end time of the jobnet the execution of which is ended before the execution of each of the jobnets makes it possible to create a prediction model capable of appropriately estimating the order of executing the jobnets and estimating the execution time of each jobnet more accurately.

Moreover, in the present embodiments, in the jobnet execution time prediction model generation processing, the information processing apparatus may acquire information about a resource usage condition of a predetermined information processing apparatus executing each of the previously executed jobnets at a time of executing each of the jobnets, and create the execution time prediction model on the basis of the acquired information about the resource usage condition and the information associated with the execution time of each of the previously executed jobnets.

In this way, creating the execution time prediction model using the resource usage condition of each job execution agent executing each jobnet at the time of executing each jobnet makes it possible to generate the prediction model capable of more accurately estimating the execution time of each jobnet even in a case in which the job execution agents differ in performance and in execution time of each jobnet.

What is claimed is:

1. A job management method performed by a job management system comprising a processor and a memory, the job management method comprising the steps of:
    jobnet execution time prediction model generation processing for:
        acquiring information about a resource usage condition of the job management system at a time of previously executing each jobnet of the plurality of jobnets; and
        generating an execution time prediction model for predicting execution time for each jobnet based on the acquired information associated with execution time of each of the previously executed jobnets;
    prediction model accuracy determination processing for calculating prediction accuracy for the execution time of each of the plurality of jobnets by the generated execution time prediction model;
    jobnet execution time collection processing for calculating a statistical value of the execution time of each of the plurality of jobnets on a basis of the information associated with the execution time of each of the previously executed jobnets;
    delay determination processing for determining whether to predict execution end timing of a designated jobnet among a jobnet group that is a set of a plurality of jobnets currently being executed or to be subsequently executed on a basis of the execution time prediction model, on a basis of the calculated prediction accuracy for the execution time of each of the plurality of jobnets, and for displaying information associated with the execution end timing of the designated jobnet predicted on the basis of the execution time prediction model in a case of determining to predict the execution end timing of the designated jobnet on the basis of the execution time prediction model,
    wherein the delay determination processing further includes:
        determining whether to predict the execution end timing of the designated jobnet on the basis of the execution time prediction model by determining whether the prediction accuracy for the execution time of the designated jobnet by the execution time prediction model is equal to or higher than a predetermined value; and displaying the information associated with the execution end timing of the designated jobnet predicted on the basis of:
- (a) the execution time prediction model in a case of determining that the prediction accuracy for the execution time is equal to or higher than the predetermined value; or
- (b) the calculated statistical value in a case of determining that the prediction accuracy for the execution time is not equal to or higher than the predetermined value; and executing the designated jobnet on the basis of the execution time prediction model.

2. The job management method according to claim 1, wherein the delay determination processing includes waiting for a predetermined period of time before displaying the information associated with the execution end timing of the designated jobnet calculated based on the calculated statistical value in the case of determining that the prediction accuracy for the execution time is not equal to or higher than the predetermined value.

3. The job management method according to claim 1, wherein the jobnet execution time collection processing includes calculating, as the statistical value of the execution time of each of the jobnets, an average value and a maximum value of the execution time of each of the jobnets on the basis of the information associated with the execution time of each of the previously executed jobnets, wherein the delay determination processing includes further determining whether the execution time of the designated jobnet is equal to or longer than predetermined time in the case of determining that the prediction accuracy for the execution time is not equal to or higher than the predetermined value, displaying the information associated with the execution end timing of the designated jobnet calculated based on the calculated maximum value in a case of determining that the execution time of the designated jobnet is equal to or longer than the predetermined time, and displaying the information associated with the execution end timing of the designated jobnet calculated based on the calculated average value in a case of determining that the execution time of the designated jobnet is not equal to or longer than the predetermined time.

4. The job management method according to claim 1, wherein the jobnet execution time prediction model generation processing includes estimating an order of executing the jobnets on a basis of the information associated with execution time of each of the previously executed jobnets, and wherein the delay determination processing includes identifying a jobnet earlier than the designated jobnet in the order of executing the jobnets on a basis of the estimated order of executing the jobnets.

5. The job management method according to claim 1, wherein the jobnet execution time prediction model generation processing includes calculating, as one piece of the information associated with the execution time of each of the previously executed jobnets, a wait time that is a difference between an execution start time of each of the previously executed jobnets and an execution end time of other jobnet execution of which is ended before execution of each of the jobnets, and generating the execution time prediction model on a basis of the calculated wait time.

6. A job management apparatus comprising:
a processor; and
a memory,
the job management apparatus configured to execute:
jobnet execution time prediction model generation processing for
acquiring information about a resource usage condition of the job management apparatus at a time of previously executing each jobnet of the plurality of jobnets; and
generating an execution time prediction model for predicting execution time for each jobnet based on the acquired information associated with execution time of each of the previously executed jobnets,
prediction model accuracy determination processing for calculating prediction accuracy for the execution time of each of the plurality of jobnets by the generated execution time prediction model,
jobnet execution time collection processing for calculating a statistical value of the execution time of each of the plurality of jobnets on a basis of the information associated with the execution time of each of the previously executed jobnets;
delay determination processing for determining whether to predict execution end timing of a designated jobnet among a jobnet group that is a set of a plurality of jobnets currently being executed or to be subsequently executed on a basis of the execution time prediction model, on a basis of the calculated prediction accuracy for the execution time of each of the plurality of jobnets, and for displaying information associated with the execution end timing of the designated jobnet predicted based on the execution time prediction model in a case of determining to predict the execution end timing of the designated jobnet on the basis of the execution time prediction model,
wherein the delay determination processing includes:
determining whether to predict the execution end timing of the designated jobnet on the basis of the execution time prediction model by determining whether the prediction accuracy for the execution time of the designated jobnet by the execution time prediction model is equal to or higher than a predetermined value; and
displaying the information associated with the execution end timing of the designated jobnet predicted on the basis of:
- (a) the execution time prediction model in a case of determining that the prediction accuracy for the execution time is equal to or higher than the predetermined value; or
- (b) the calculated statistical value in a case of determining that the prediction accuracy for the execution time is not equal to or higher than the predetermined value; and executing the designated jobnet on the basis of the execution time prediction model.

* * * * *